United States Patent
Tsutsumi et al.

(10) Patent No.: US 7,926,331 B2
(45) Date of Patent: Apr. 19, 2011

(54) DETECTION OF FUEL PROPERTY BASED ON CHANGE IN ROTATIONAL SPEED OF ENGINE

(75) Inventors: Koji Tsutsumi, Kariya (JP); Xinyi Li, Nagoya (JP); Kazuhiro Higuchi, Ichinomiya (JP); Hironari Nakagawa, Nagoya (JP); Akikazu Kojima, Gamagoori (JP); Youhei Morimoto, Kariya (JP); Shinya Hoshi, Kariya (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 153 days.

(21) Appl. No.: 12/362,701

(22) Filed: Jan. 30, 2009

(65) Prior Publication Data
US 2009/0198456 A1 Aug. 6, 2009

(30) Foreign Application Priority Data
Jan. 31, 2008 (JP) ................. 2008-020956

(51) Int. Cl.
*G01M 15/00* (2006.01)
(52) U.S. Cl. .......... 73/114.38; 73/35.02; 73/114.53
(58) Field of Classification Search ............. 73/35.02, 73/114.38, 114.53
See application file for complete search history.

(56) References Cited

U.S. PATENT DOCUMENTS

| | | | | |
|---|---|---|---|---|
| 5,457,985 | A | 10/1995 | Cellier et al. ............. | 73/35.02 |
| 7,367,223 | B2 | 5/2008 | Kettl et al. ............... | 73/53.05 |
| 7,401,591 | B2 | 7/2008 | Yamaguchi et al. ......... | 123/299 |
| 7,421,884 | B2 | 9/2008 | Aoyama ................. | 73/35.02 |
| 7,444,984 | B2 | 11/2008 | Yamaguchi et al. ..... | 123/406.47 |
| 7,480,557 | B2 | 1/2009 | Yamaguchi et al. ......... | 701/104 |
| 7,621,174 | B2 | 11/2009 | Takaku ................ | 73/114.53 |
| 7,673,618 | B2 | 3/2010 | Hasegawa et al. ......... | 123/435 |
| 2005/0071073 | A1 | 3/2005 | Ueda et al. | |
| 2007/0079647 | A1 | 4/2007 | Aoyama | |
| 2007/0151542 | A1 | 7/2007 | Yamaguchi et al. | |
| 2007/0204674 | A1 | 9/2007 | Takaku ................. | 73/35.02 |
| 2010/0088008 | A1 | 4/2010 | Tanaka et al. ............ | 701/104 |

FOREIGN PATENT DOCUMENTS

| | | |
|---|---|---|
| JP | 2004-218470 | 8/2004 |
| JP | 2004-346810 | 12/2004 |
| JP | 2005-127304 | 5/2005 |
| JP | 2005-344557 | 12/2005 |
| JP | 2006-016994 | 1/2006 |
| JP | 2007-154699 | 6/2007 |
| JP | 2007-332877 | 12/2007 |
| JP | 2009-121322 | 6/2009 |
| WO | WO 2009/063298 | 5/2009 |

OTHER PUBLICATIONS

Japanese Office Action dated Jan. 5, 2010, issued in corresponding Japanese Application No. 2008-020956, with English translation.
Japanese Office Action dated May 18, 2010, issued in corresponding Japanese Application No. 2008-020956, with English translation.

*Primary Examiner* — Freddie Kirkland, III
(74) *Attorney, Agent, or Firm* — Nixon & Vanderhye P.C.

(57) ABSTRACT

There is disclosed a fuel property detector for detecting a property of fuel injected by a fuel injector into a cylinder of an internal combustion engine. The fuel property detector includes an injection commander, a change detector, and a fuel property determiner. The injection commander commands the fuel injector to perform a fuel injection for fuel property detection into the cylinder of the engine. The change detector detects a change in the rotational speed of the engine which is caused by the fuel injection for fuel property detection. The fuel property determiner determines the property of the fuel based on the change in the rotational speed of the engine detected by the change detector.

40 Claims, 12 Drawing Sheets

DETECTION OF FUEL PROPERTY BASED ON CHANGE IN ROTATIONAL SPEED OF ENGINE

CROSS-REFERENCE TO RELATED APPLICATION

This application is based on and claims priority from Japanese Patent Application No. 2008-20956, filed on Jan. 31, 2008, the content of which is hereby incorporated by reference in its entirety into this application.

BACKGROUND OF THE INVENTION

1. Technical Field of the Invention

The present invention relates generally to fuel property detectors, which detect properties of fuel injected by fuel injectors into cylinders of internal combustion engines, and fuel injection systems with such fuel property detectors.

More particularly, the invention relates to a fuel property detector, which detects a property of fuel injected by fuel injectors into cylinders of an internal combustion engine based on a change in the rotational speed of the engine, and a fuel injection system with the fuel property detector.

2. Description of the Related Art

The state of combustion in cylinders of an internal combustion engine depends on the properties of fuel injected by fuel injectors into the cylinders. Moreover, an engine ECU (Electronic Control Device) is generally employed to control combustion in the cylinders of the engine based on the supposition that a reference fuel be used in the engine. Therefore, when the fuel actually injected into the cylinders of the engine has a property (e.g., cetane number) different from that of the reference fuel, the ECU may become unable to suitably control the combustion in the cylinders, causing problems which may include a decrease in the output torque of the engine and an increase in the noise generated by the engine.

For example, when the fuel actually injected into the cylinders of the engine has a lower cetane number than the reference fuel, the output torque of the engine may be decreased. On the other hand, when the fuel actually injected into the cylinders of the engine has a higher cetane number than the reference fuel, the noise generated by the engine may be increased.

To solve the above problem, Japanese Patent First Publication No. 2006-16994 discloses a control apparatus for an internal combustion engine which can detect the cetane number of the fuel actually injected into the cylinders of the engine. More specifically, the control apparatus is configured to: detect an ignition delay of the fuel injected by a fuel injector into a cylinder of the engine by using a cylinder internal pressure sensor; and determine the cetane number of the fuel based on the detected ignition delay.

However, with such a configuration, it is necessary to employ the cylinder internal pressure sensor for detecting the cetane number of the fuel, resulting in an increased manufacturing cost.

SUMMARY OF THE INVENTION

The present invention has been made in view of the above-mentioned problems.

According to the present invention, there is provided a fuel property detector for detecting a property of fuel injected by a fuel injector into a cylinder of an internal combustion engine. The fuel property detector includes an injection commander, a change detector, and a fuel property determiner.

The injection commander commands the fuel injector to perform a fuel injection for fuel property detection into the cylinder of the engine. The change detector detects a change in the rotational speed of the engine which is caused by the fuel injection for fuel property detection. The fuel property determiner determines the property of the fuel based on the change in the rotational speed of the engine detected by the change detector.

According to further implementations of the invention, the fuel property detector further includes a torque estimator that estimates, based on the change in the rotational speed of the engine detected by the change detector, torque which is generated by the engine through the fuel injection for fuel property detection. The fuel property determiner determines the property of the fuel based on the torque estimated by the torque estimator.

The fuel property detector further includes a condition determiner that determines whether a condition for detecting the property of the fuel is satisfied. The injection commander commands the fuel injector to perform the fuel injection for fuel property detection only when it is determined by the condition determiner that the condition for detecting the property of the fuel is satisfied. Further, the condition for detecting the property of the fuel is preferably set to a condition where the engine is decelerating without the fuel being injected into the engine.

The engine is a compression ignition engine. The injection commander commands the fuel injector to perform the fuel injection for fuel property detection at an injection timing retarded from top-dead-center.

The property of the fuel detected by the fuel property detector is the cetane number of the fuel.

According to the present invention, there is also provided a fuel injection system which includes an accumulator, the fuel injector as described above, and the fuel properly detector according to the present invention. The accumulator accumulates high-pressure fuel. The fuel injector injects the high-pressure fuel accumulated in the accumulator into the cylinder of the engine. The fuel property detector detects the property of the high-pressure fuel.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Preferred embodiments of the present invention will be described hereinafter with reference to FIGS. 1-16.

First Embodiment

Figure 1:
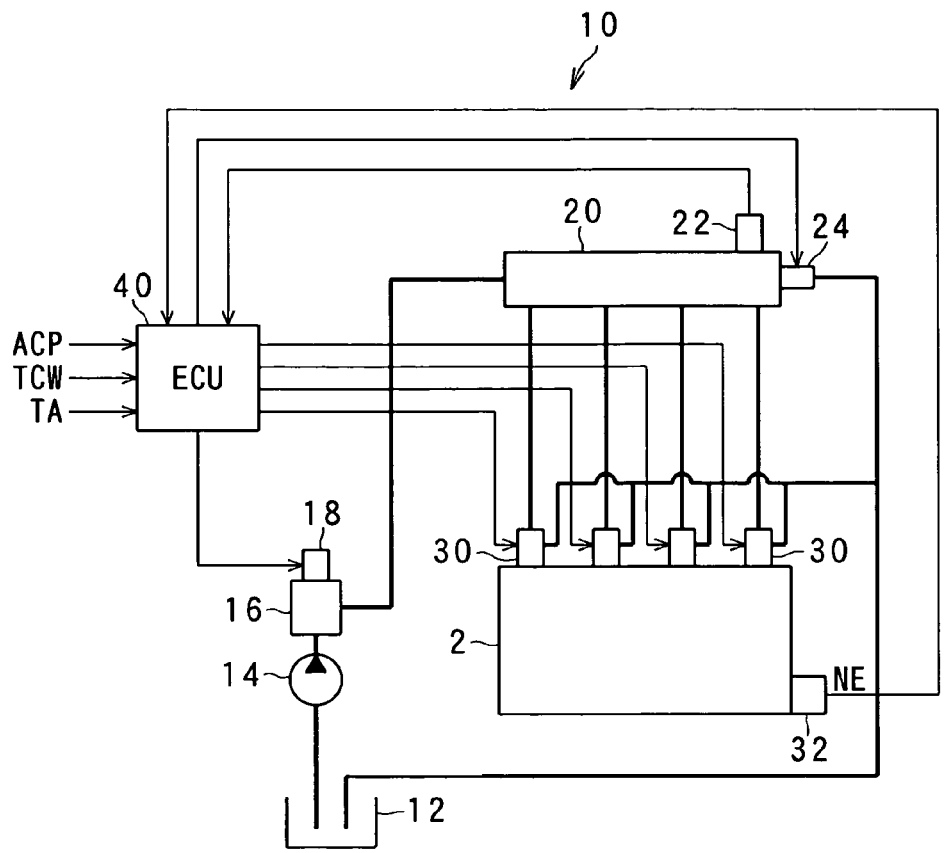
FIG. 1 is a schematic view showing the overall configuration of a common rail fuel injection system for a diesel engine according to the first embodiment of the invention.

FIG. 1 shows the overall configuration of a common rail fuel injection system 10 according to the first embodiment of the invention. The fuel injection system 10 is configured to supply fuel to, for example, a four-cylinder diesel engine 2 of a motor vehicle.

The fuel injection system 10 includes, as shown in FIG. 1, a common rail 20 that accumulates high-pressure fuel, four injectors 30 each of which injects the high-pressure fuel accumulated in the common rail 20 into a corresponding one of the four cylinders of the engine 2, and an Electronic Control Unit (ECU) 40 that controls operation of the system 10.

The fuel injection system 10 further includes, for supplying the high-pressure fuel to the common rail 20, a feed pump 14 and a high-pressure pump 16. The feed pump 14 draws fuel from a fuel tank 12 and feeds the drawn fuel to the high-pressure pump 16. The high-pressure pump 16 pressurizes the fuel fed by the feed pump 14, and discharges the resultant high-pressure fuel to the common rail 20.

In the present embodiment, the high-pressure pump 16 is implemented by a well-known reciprocating-type pump which includes a plunger (not shown) that reciprocates with rotation of a camshaft (not shown) driven by the engine 2. With the reciprocation of the plunger, the fuel is sucked from the feed pump 14 into a pressure chamber (not shown), pressurized in the pressure chamber, and discharged out of the pressure chamber to the common rail 20. Moreover, on the high-pressure pump 16, there is mounted a fuel-feed adjusting valve 18 that adjusts the quantity of the fuel fed by the feed pump 14 into the pressure chamber.

On the common rail 20, there are mounted a pressure sensor 22 and a pressure reducing valve 24. The pressure sensor 22 senses the fuel pressure inside the common rail 20 (to be simply referred to as rail pressure hereinafter). The pressure reducing valve 24 reduces the rail pressure by releasing the fuel accumulated in the common rail 20 to the fuel tank 12.

On the other hand, on the engine 2, there are mounted various sensors for sensing the operating condition of the engine 2. Those sensors include a rotational speed sensor 32 for sensing the rotational speed NE of the engine 2, an accelerator position sensor (not shown) for sensing the position ACP of the vehicle accelerator, a water temperature sensor (not shown) for sensing the temperature TCW of cooling water for the engine 2, and an air temperature sensor (not shown) for sensing the temperature TA of intake air to the engine 2. In addition, the rotational speed Ne of the engine 2 denotes, hereinafter, the rotational speed of a crankshaft (not shown) of the engine 2.

Each of the fuel injectors 30 is implemented by a well-known injection valve which has an injection hole (not shown), a nozzle needle (not shown), and a pressure chamber (not shown). The injection hole is opened and closed by the nozzle needle, thereby selectively injecting the high-pressure fuel supplied from the common rail 20 into the corresponding cylinder of the engine 2. The nozzle needle is moved by a change in the internal pressure of the pressure chamber. Further, the internal pressure of the pressure chamber is controlled by the ECU 40.

The ECU 40 is implemented by a microcomputer which includes a CPU, a ROM, a RAM, a flash memory, and I/O devices. The ECU 40 is configured to receive sensing signals, which are output from the pressure sensor 22 mounted on the common rail 20 and the sensors mounted on the engine 2, and perform both a rail pressure control and a fuel injection control based on the sensing signals.

More specifically, in the rail pressure control, the ECU 40 first sets a target value of the rail pressure based on the sensing signals, and then controls both the fuel-feed adjusting valve 18 and the pressure reducing valve 24 to bring the rail pressure sensed by the pressure sensor 22 into agreement with the target value. In the fuel injection control, the ECU 40 first sets injection quantities and injection timings based on the sensing signals, and then controls the fuel injectors 30 to inject the set injection quantities of the fuel into the corresponding cylinders of the engine 2 at the set injection timings.

Moreover, according to the operating condition of the engine 2, the ECU 40 may also control each of the fuel injectors 30 to perform a multistage injection which includes, for example, a main injection, a pilot injection prior to the main injection, and a post injection after the main injection.

Furthermore, in the present embodiment, the ECU 40 also serves as a fuel property detector to detect a property, more particularly the cetane number, of the fuel injected by the fuel injectors 30 into the cylinders of the engine 2.

To this end, in the present embodiment, the ECU 40 performs the following functions by executing a program installed in the ROM or flash memory thereof.

1) Determining Condition for Fuel Property Detection

The ECU 40 first determines whether a condition for detecting the cetane number of the fuel is satisfied.

In the present embodiment, the condition for detecting the cetane number of the fuel is set to a decelerating and no-fuel injection condition. Here, the decelerating and no-fuel injection condition denotes a condition where the engine 2 is decelerating with the vehicle accelerator released and without the fuel being injected into the cylinders of the engine 2. In addition, in the decelerating and no-fuel injection condition, variation in the rotational speed of the engine 2 is smaller than in other operating conditions of the engine 2, and it is thus possible to accurately detect a change in the rotational speed of the engine 2.

Alternatively, the condition for detecting the cetane number of the fuel may be set to an idling condition where the engine 2 is idling and variation in the rotational speed of the engine 2 is small.

2) Commanding Injection for Fuel Property Detection

When the condition for detecting the cetane number of the fuel is satisfied, the ECU 40 commands one of the fuel injectors 30 to perform "injections for fuel property detection". Here, injections for fuel property detection denote fuel injections which are performed for the purpose of detecting the cetane number (i.e., a property) of the fuel. In addition, the number of injection stages, injection quantity, and injection timing for each injection for fuel property detection are different from those for a regular injection for driving the engine 2.

Figure 2:
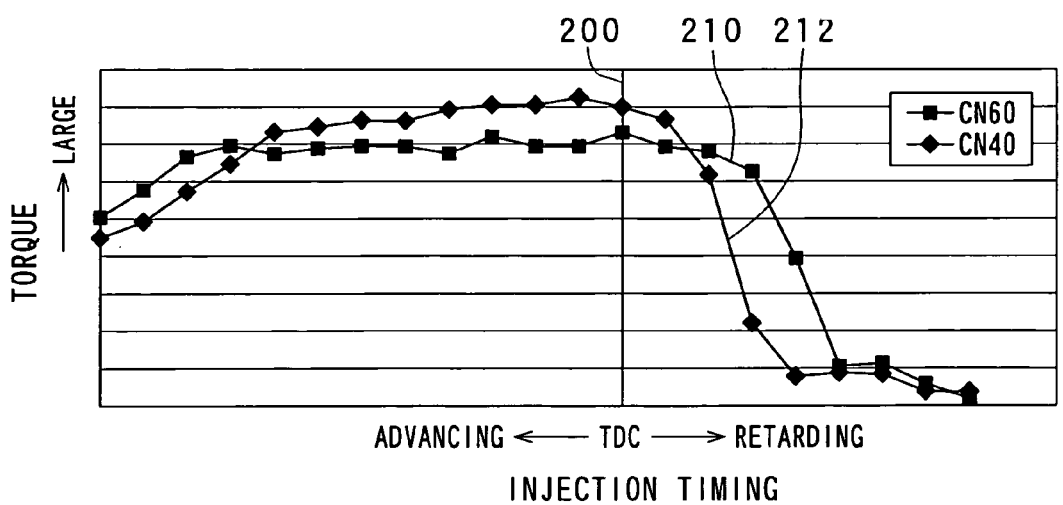
FIG. 2 is a graphical representation giving a comparison between torques generated by the engine with different cetane numbers of fuel injected into the engine.

FIG. 2 shows torques generated by the engine 2 through injections for fuel property detection which are performed at different injection timings with different cetane numbers of the fuel.

More specifically, in FIG. 2, the line 210 indicates the torques that are generated by the engine 2 through the injections for fuel property detection which are performed at different injection timings with the cetane number of the fuel equal to 60 (i.e., CN60); the line 212 indicates the torques that are generated by the engine 2 through the injections for fuel property detection which are performed at different injection timings with the cetane number of the fuel equal to 40 (i.e., CN40).

It can be seen from FIG. 2 that the differences between the torques generated with the cetane number equal to 60 and those generated with the cetane number equal to 40 are larger on the retarding side of Top-Dead-Center (TDC) 200 than on the advancing side of TDC 200.

On the advancing side of TDC 200, the internal temperature of the cylinder is high and the state of combustion in the cylinder is stable. Therefore, the ignition timings of the fuel in the injections for fuel property detection, hardly change with the cetane number of the fuel. Consequently, the torques generated through the injections for fuel property detection also hardly change with the cetane number of the fuel.

On the other hand, on the retarding side of TDC 200, the internal temperature of the cylinder is low and the state of combustion in the cylinder is unstable. Therefore, the ignition timings of the fuel in the injections for fuel property detection greatly change with the cetane number of the fuel. Consequently, the torques generated through the injections for fuel property detection also greatly change with the cetane number of the fuel.

Accordingly, in the case of detecting the cetane number of the fuel through a single injection for fuel property detection, the ECU 40 commands the fuel injector 30 to perform the injection for fuel property detection at an injection timing retarded from TDC 200. Moreover, in the case of detecting the cetane number of the fuel through a plurality of injections for fuel property detection, the ECU 40 commands the fuel injector 30 to perform the injections for fuel property detection respectively at a plurality of injection timings which are at or retarded from TDC 200. As a result, the ECU 40 can accurately determine the cetane number of the fuel based on the torque (or torques) generated by the engine 2 through the injection (or injections) for fuel property detection.

In addition, in a particularly low region of the cetane number, torques generated through injections for fuel property detection may change considerably with the cetane number of the fuel even on the advancing side of TDC 200. When the cetane number of the fuel falls in such a low region, the ECU 40 may also command the fuel injector 30 to perform an injection (or a plurality of injections) for fuel property detection at an injection timing (or injection timings) advanced from TDC 200.

Moreover, in the present embodiment, the number of injection stages in each injection for fuel property detection is equal to 1. In other words, each injection for fuel property detection is a single-shot injection.

3) Detecting Change in Rotational Speed of Engine

The ECU 40 detects, based on the sensing signal output from the rotational speed sensor 32, the increase $\Delta NE$ in the rotational speed of the engine 2 which is caused by an injection for fuel property detection.

4) Estimating Torque

The ECU 40 estimates, using the following equation, the torque T which is generated by the engine 2 through the injection for fuel property detection.

$$T = k \times NE \times \Delta NE \qquad \text{(Equation 1)}$$

where k is a proportionality constant, NE is the rotational speed of the engine 2 at the start of the injection for fuel property detection, and $\Delta NE$ is the increase in the rotational speed of the engine 2 through the injection for fuel property detection.

5) Determining Fuel Property

Both the increase $\Delta NE$ in the rotational speed of the engine 2 and the torque T generated by the engine 2 depend on the cetane number of the fuel injected by the fuel injector 30 into the cylinder of the engine 2. Therefore, it is possible for the ECU 40 to determine the cetane number of the fuel based either on the increase $\Delta NE$ or on the torque T.

Figure 3:
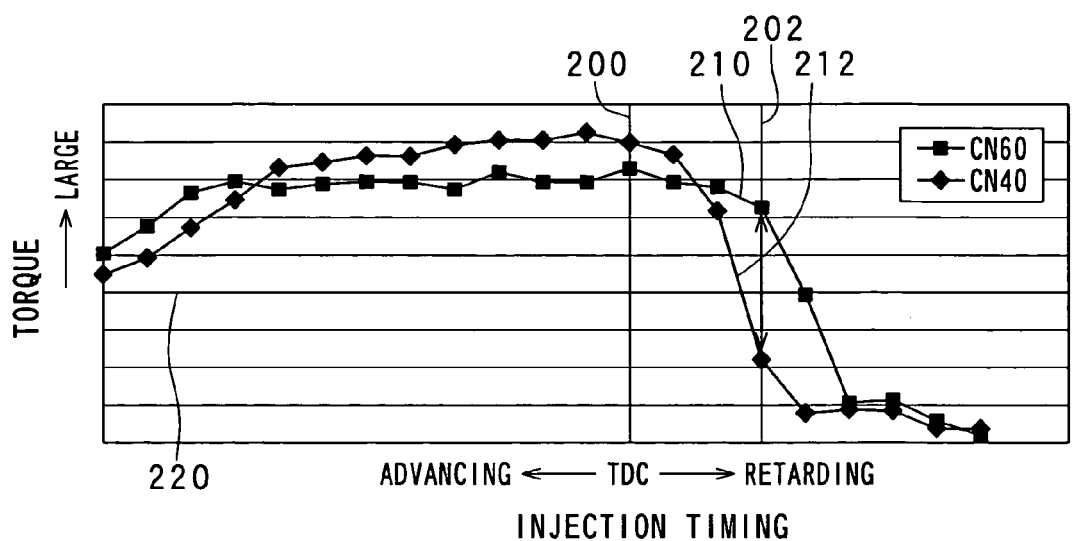
FIG. 3 is a graphical representation illustrating a method of detecting the cetane number of the fuel according to the first embodiment of the invention.

In the present embodiment, referring to FIG. 3, the ECU 40 determines the cetane number of the fuel based on a comparison between a reference torque 220 and the torque T generated by the engine 2 through an injection for fuel property detection which is performed at a predetermined injection timing 202.

For example, when there axe only two candidates of 40 and 60 for the cetane number of the fuel, the ECU 40 determines the cetane number as being 40 if the torque T generated by the engine 2 is lower than the reference torque 220 and as being 60 if the same is higher than the reference toque 220.

Moreover, when there are three or more candidates for the cetane number of the fuel, the ECU 40 determines the cetane number by further checking the difference between the torque T generated by the engine 2 and the reference torque 220.

In addition, it is also possible for the ECU 40 to determine the cetane number of the fuel by comparing the torque T generated by the engine 2 with a plurality of reference torques.

6) Controlling Combustion

The ECU 40 controls combustion in the cylinders of the engine 2 based on the determined cetane number of the fuel as well as on the operating condition of the engine 2.

More specifically, the ECU 40 first sets, based on the determined cetane number of the fuel as well as on the sensing signals output from the sensors, injection quantities and injection timings for regular injections for driving the engine 2. Then, the ECU 40 controls the fuel injectors 30 to inject the set injection quantities of the fuel into the corresponding cylinders of the engine 2 at the set injection timings.

Since the injection timings and injection quantities are set based on the cetane number of the fuel, it is possible to maximize the torque generated by the engine 2 while minimizing the noise generated by the engine 2.

In addition, when there is provided an exhaust gas recirculation system for the engine 2, the ECU 40 may further set the amount of the exhaust gas to be recirculated based on the determined cetane number of the fuel.

After having described the overall configuration of the fuel injection system 10 and the functions of the ECU 40, a process of the ECU 40 for detecting the cetane number of the fuel according to the present embodiment will be described with reference to FIG. 11.

Figure 11:
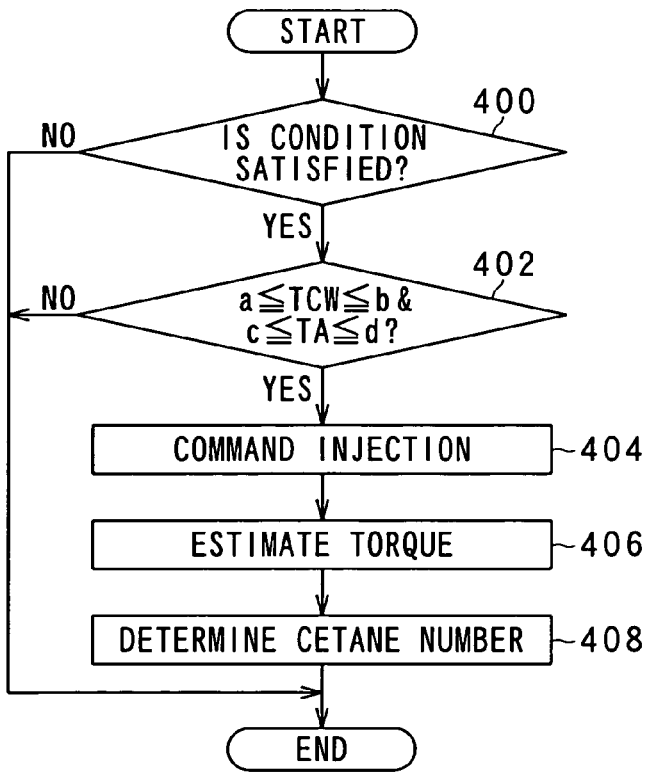
FIG. 11 is a flow chart illustrating a process of an engine ECU for detecting the cetane number of the fuel according to the first embodiment of the invention.

First, in step S400 of FIG. 11, the ECU 40 determines whether the condition for detecting the cetane number of the fuel is satisfied.

As described previously, in the present embodiment, the condition for detecting the cetane number of the fuel is set to the decelerating and no-fuel injection condition where the engine 2 is decelerating with the vehicle accelerator released and without the fuel being injected into the cylinders of the engine 2.

If the determination in step S400 results in a "NO" answer, then the process directly goes to the end. On the other hand, if the determination in step S400 results in a "YES" answer, then the process proceeds to step S402.

In step S402, the ECU 40 further determines whether the temperature TCW of the cooling water is in a predetermined range of (a, b) and the temperature TA of the intake air is in a predetermined range of (c, d).

If the determination in step S402 results in a "NO" answer, then the process directly goes to the end. On the other hand, if the determination in Step S402 results in a "YES" answer, then the process proceeds to step S404.

In step S404, the ECU 40 commands the fuel injector 30 to perform an injection for fuel property detection.

As described previously, in the present embodiment, the injection for fuel property detection is a single-shot injection. Therefore, upon being commanded by the ECU 40, the fuel injector 30 performs a single-shot injection at an injection timing retarded from TDC 200.

In step S406, the ECU 40 estimates the torque T generated by the engine 2 through the injection for fuel property detection.

More specifically, the ECU 40 first detects, based on the sensing signal output from the rotational speed sensor 32, the increase ΔNE in the rotational speed of the engine 2 which is caused by the injection for fuel property detection. Then, the ECU 40 estimates the torque T based on the increase ΔNE and using Equation 1.

In step S408, the ECU 40 determines the cetane number of the fuel based on a comparison between the torque T estimated in step S406 and the reference torque 220 as shown in FIG. 3. After that, the process goes to end.

According to the present embodiment, the following advantages can be obtained.

In the present embodiment, the ECU 40 serves as a fuel property detector to detect a property, more particularly the cetane number, of the fuel injected by the fuel injectors 30 into the cylinders of the engine 2. To this end, the ECU 40 first commands, as an injection commander, one of the fuel injectors 30 to perform a fuel injection for fuel property detection into the corresponding cylinder of the engine 2. Then, the ECU 40 detects, as a change detector, the increase ΔNE in the rotational speed of the engine 2 which is caused by the injection for fuel property detection. Thereafter, the ECU 40 estimates, as a torque estimator, the torque T which is generated by the engine 2 through the injection for fuel property detection. Finally, the ECU 40 determines, as a property determiner, the cetane number of the fuel based the estimated torque T. In addition, it should be noted that the ECU 40 may also determine the cetane number of the fuel based directly on the increase ΔNE in the rotational speed of the engine 2 instead of on the torque T.

As described previously, the state of combustion in the cylinders of the engine 2 depends on the properties of the fuel injected by the fuel injectors 30 into the cylinders. Accordingly, both the increase ΔNE in the rotational speed of the engine 2 and the torque T generated by the engine 2 depend on the properties, for example the cetane number, of the fuel.

Therefore, with the above configuration, the ECU 40 can accurately detect the cetane number of the fuel. Moreover, in the present embodiment, the ECU 40 detects the increase ΔNE in the rotational speed of the engine 2 based on the sensing signal output from the rotational speed sensor 32 which has already existed in the fuel injection system 10 for the fuel injection control. Therefore, without employing any additional sensor, the manufacturing cost can be minimized.

In the present embodiment, the ECU 40 further determines, as a condition determiner, whether a condition for detecting the cetane number of the fuel is satisfied. When it is determined that the condition is satisfied, the ECU 40 commands the fuel injector 30 to perform the injection for fuel property detection. Moreover, in the present embodiment, the condition for detecting the cetane number of the fuel is set to the decelerating and no-fuel injection condition.

In the decelerating and no-fuel injection condition, variation in the rotational speed of the engine 2 is smaller than in other operating conditions of the engine 2. Therefore, with the above configuration, the ECU 40 can accurately detect the increase ΔNE in the rotational speed of the engine 2 which is caused by the injection for fuel property detection.

In the present embodiment, the ECU 40 commands the fuel injector 30 to perform the injection for fuel property detection at an injection timing retarded from TDC 200.

In the diesel engine 2, which is a compression ignition engine, the increase ΔNE in the rotational speed of the engine 2 depends only slightly on the cetane number of the fuel on the advancing side of TDC 200, but depends heavily on the same on the retarding side of TDC 200. Therefore, with the above configuration, the ECU 40 can more accurately determine the cetane number of the fuel based on the increase ΔNE in the rotational speed of the engine 2.

In the present embodiment, the ECU 40 determines the cetane number of the fuel based on a comparison between the estimated torque T and the reference torque 220.

With the above configuration, the ECU 40 can easily determine the cetane number of the fuel.

In addition, in the case of determining the cetane number of the fuel based on the increase ΔNE in the rotational speed of the engine 2, the ECU 40 may make the determination based on a comparison between the increase ΔNE and a reference value.

In the present embodiment, the ECU 40 controls regular injections for driving the engine 2 based on the determined cetane number of the fuel as well as on the operating condition of the engine 2. Consequently, the fuel injectors 30 of the fuel injection system 10 can more suitably and reliably inject the fuel into the corresponding cylinders of the engine 2.

Second Embodiment

This embodiment illustrates a process of the ECU 40 for detecting the cetane number of the fuel, which is different from the process described in the first embodiment.

Figure 4:
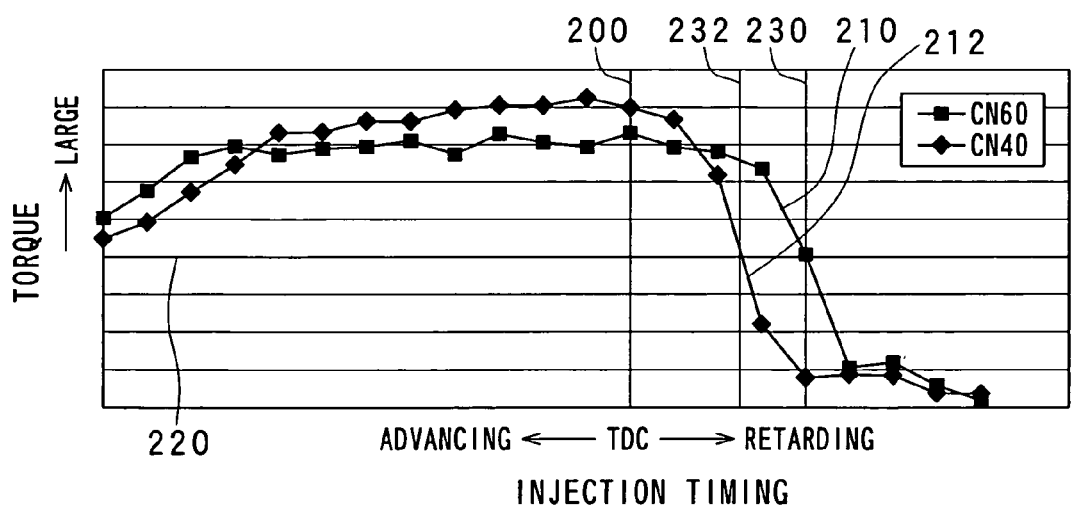
FIG. 4 is a graphical representation illustrating a method of detecting the cetane number of the fuel according to the second embodiment of the invention.

Referring to FIG. 4, an injection timing 230 corresponds to the reference torque 220 on the line 210 that indicates torques generated through injections for fuel property detection which are performed with the cetane number of the fuel equal to 60. In other words, if an injection for fuel property detection was performed at the injection timing 230 with the cetane number equal to 60, the torque generated by the engine 2 would be equal to the reference torque 220.

On the other hand, an injection timing 232 corresponds to the reference torque 220 on the line 212 that indicates torques generated through injections for fuel property detection which are performed with the cetane number of the fuel equal to 40. In other words, if an injection for fuel property detection was performed at the injection timing 232 with the cetane number equal to 40, the torque generated by the engine 2 would be equal to the reference torque 220.

It can be seen from FIG. 4 that the injection timing 230 is different from the injection timing 232. More specifically, the injection timing 230 necessary for causing the engine 2 to generate the reference torque 220 with the cetane number of the fuel equal to 60 lags behind the injection timing 232 necessary for causing the engine 2 to generate the reference torque 220 with the cetane number of the fuel equal to 40.

In view of the above, in the present embodiment, the ECU 40 first estimates an injection timing necessary for causing the engine 2 to generate the reference torque 220, and then determines the cetane number of the fuel based on the estimated injection timing.

Figure 12:
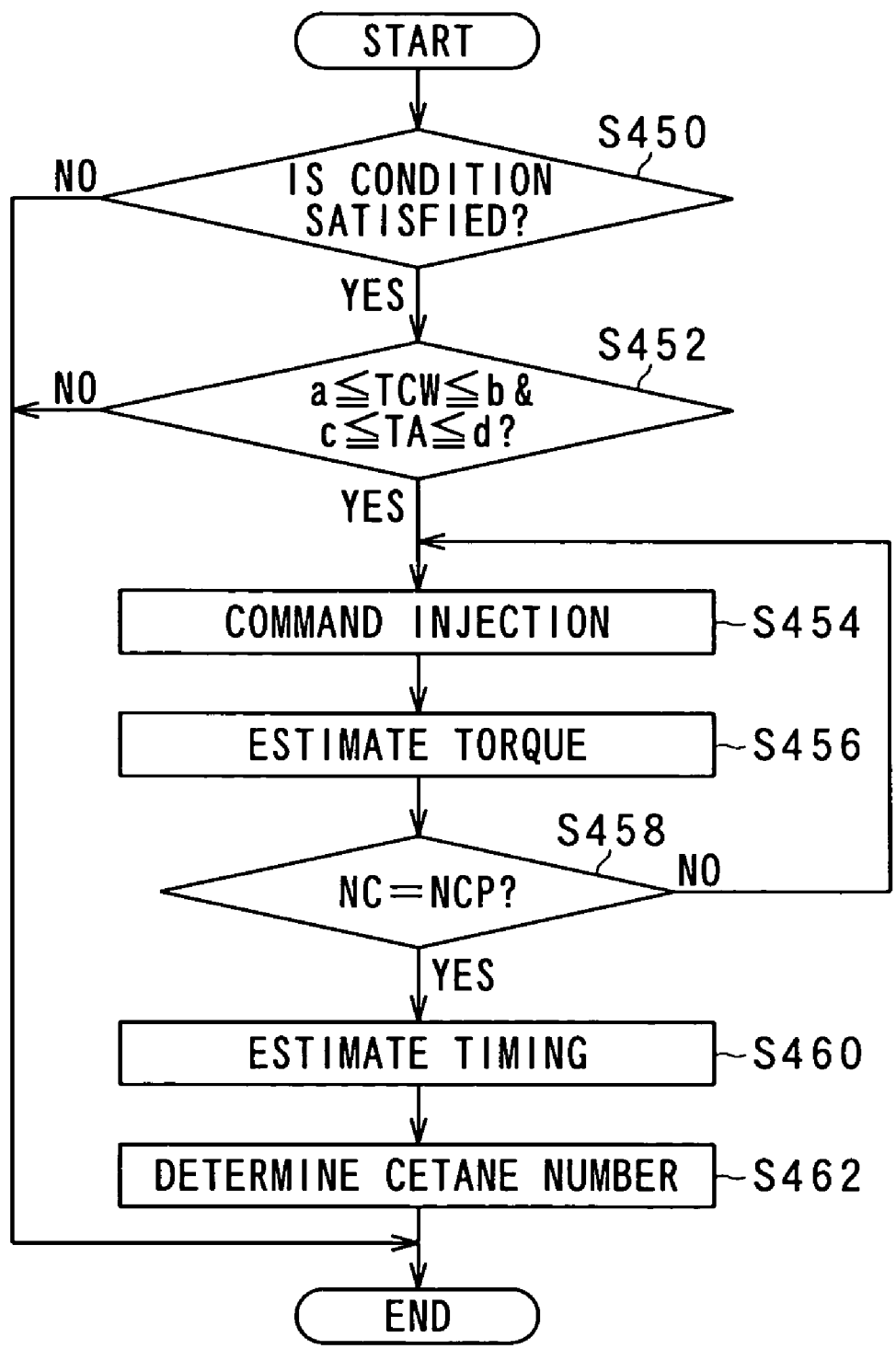
FIG. 12 is a flow chart illustrating a process of the engine ECU for detecting the cetane number of the fuel according to the second embodiment of the invention.

FIG. 12 shows the process of the ECU 40 for detecting the cetane number of the fuel according to the present embodiment.

First, in step S450, the ECU 40 determines whether the condition for detecting the cetane number of the fuel is satisfied.

If the determination in step S450 results in a "NO" answer, then the process directly goes to the end. On the other hand, if the determination in step S450 results in a "YES" answer, then the process proceeds to step S452.

In step S452, the ECU 40 further determines whether the temperature TCW of the cooling water is in the predetermined range of (a, b) and the temperature TA of the intake air is in the predetermined range of (c, d).

If the determination in step S452 results in a "NO" answer, then the process directly goes to the end. On the other hand, if the determination in step S452 results in a "YES" answer, then the process proceeds to step S454.

In step S454, the ECU 40 commands the fuel injector 30 to perform an injection for fuel property detection at an injection timing that is not advanced from TDC 200.

Upon being commanded by the ECU 40, the fuel injector 30 performs a single-shot injection at the injection timing.

In step S456, the ECU 40 estimates the torque T that is generated by the engine 2 through the injection for fuel property detection.

More specifically, the ECU 40 first detects, based on the sensing signal output from the rotational speed sensor 32, the increase ΔNE in the rotational speed of the engine 2 which is caused by the injection for fuel property detection. Then, the ECU 40 estimates the torque T based on the increase ΔNE.

In step S458, the ECU 40 determines whether a counter number NC, which indicates the number of injections for fuel property detection having been performed, is equal to a predetermined number NCP.

If the determination in step S458 results in a "NO" answer, then the process returns to step S454 to iterate steps S454-S458.

It should be noted that, from the second iteration, the ECU 40 commands the fuel injector 30 to perform an injection for fuel property detection at an injection timing that is different from all the injection timings (or timing) for the previous injections (or injection) for fuel property detection.

On the other hand, if the determination in step S458 results in a "YES" answer, then the process proceeds to step S460.

In step S460, the ECU 40 estimates, based on all the torques T estimated in step S456, the injection timing necessary for causing the engine 2 to generate the reference torque 220.

In step S462, the ECU 40 determines the cetane number of the fuel based on a comparison between the injection timing estimated in step S460 and a reference injection timing. After that, the process goes to the end.

As above, in the present embodiment, the ECU 40 determines the cetane number of the fuel based on a plurality of detected values (i.e., the increases ΔNE in the rotational speed of the engine 2). Consequently, the ECU 40 can more accurately determine the cetane number of the fuel than in the first embodiment.

In addition, in the case of determining the cetane number of the fuel based on the increases ΔNE in the rotational speed of the engine 2, the ECU 40 may first estimate an injection timing necessary for causing a predetermined increase in the rotational speed of the engine 2, and then determine the cetane number of the fuel based on a comparison between the estimated injection timing and a reference injection timing.

Third Embodiment

This embodiment illustrates a process of the ECU 40 for detecting the cetane number of the fuel, which is different from the processes described in the previous embodiments.

Figure 5:
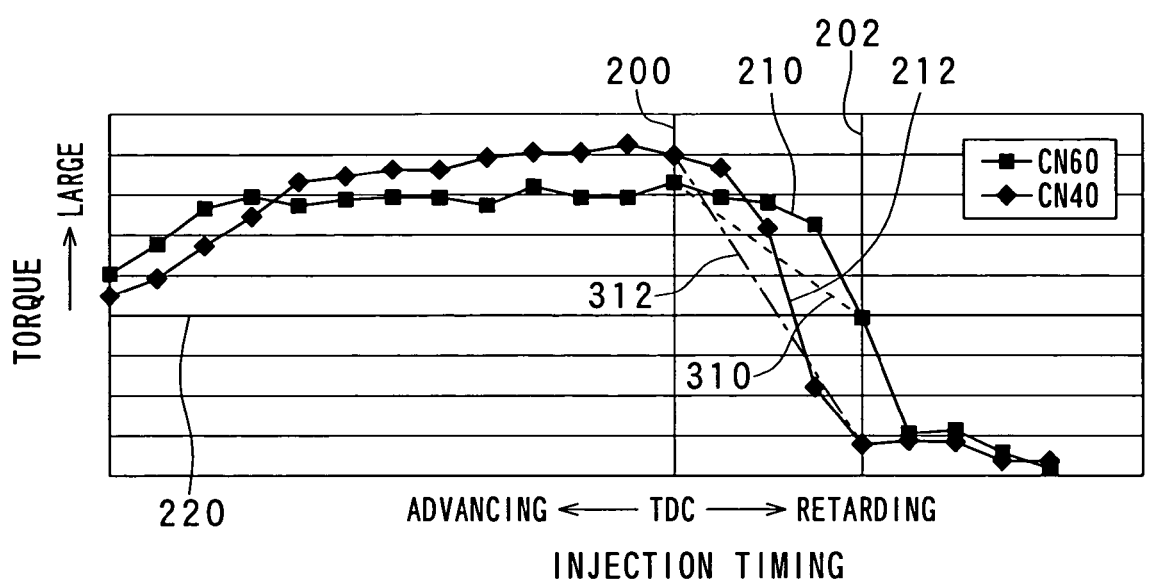
FIG. 5 is a graphical representation illustrating a method of detecting the cetane number of the fuel according to the third embodiment of the invention.

Referring to FIG. 5, a dashed line 310 connects two points on the line 210 that indicates torques generated through injections for fuel property detection which are performed with the cetane number of the fuel equal to 60. One of the two points indicates the torque generated through the injection for fuel property detection which is performed at TDC 200; the other indicates the torque generated through the injection for fuel property detection which is performed at the predetermined injection timing 202.

On the other hand, a chain line 312 connects two points on the line 212 that indicates torques generated through injections for fuel property detection which are performed with the cetane number of the fuel equal to 40. One of two points indicates the torque generated through the injection for fuel property detection which is performed at TDC 200; the other indicates the torque generated through the injection for fuel property detection which is performed at the predetermined injection timing 202.

It can be seen from FIG. 5 that the slope of the line 310 is different from the slope of the line 312. More specifically, the slope of the line 310 is smaller than that of the line 312.

In view of the above, in the present embodiment, the ECU 40 first computes the difference between two torques that are generated through two injections for fuel property detection which are performed respectively at two predetermined injection timings; then, it determines the cetane number of the fuel based on the computed difference.

Figure 13:
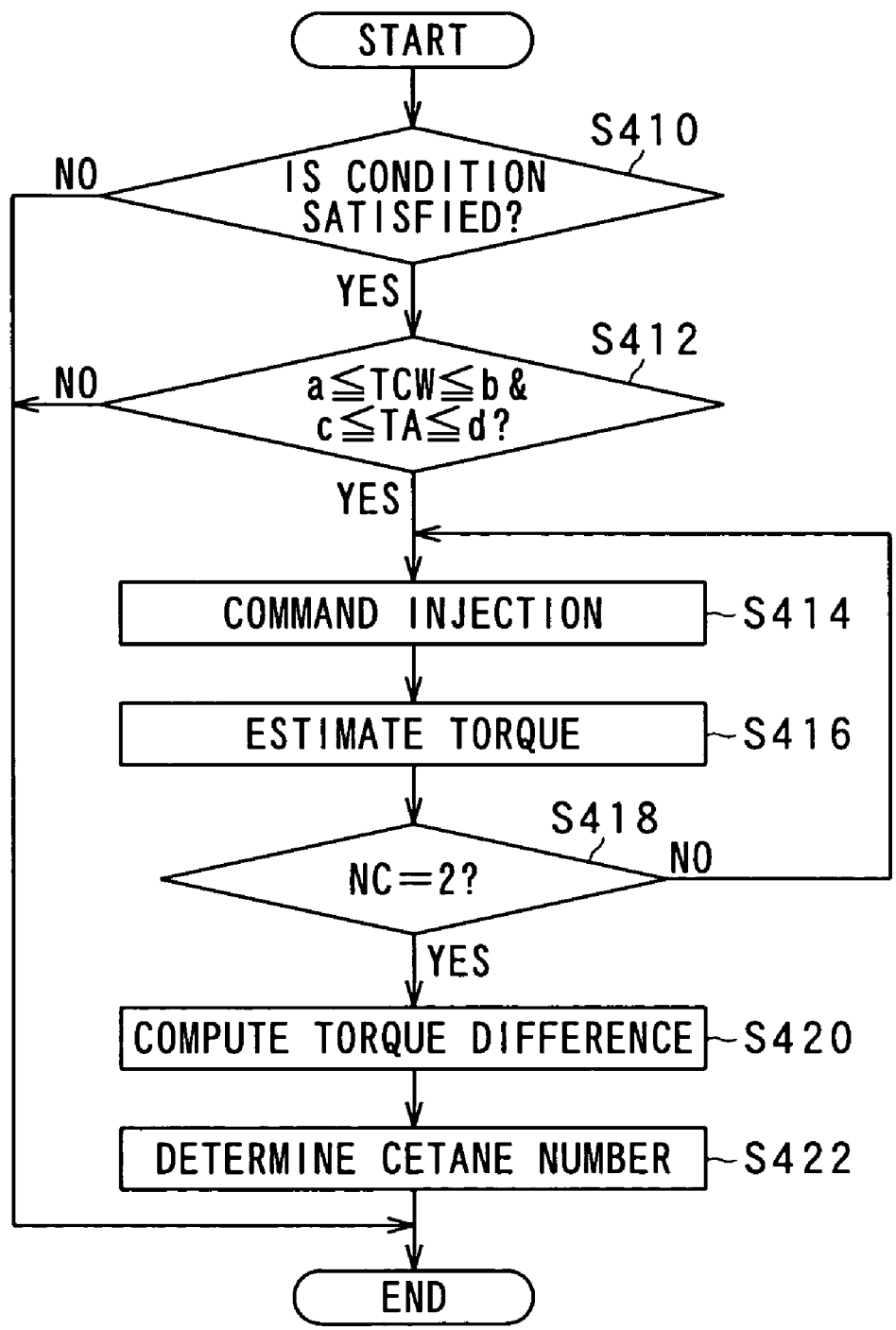
FIG. 13 is a flow chart illustrating a process of the engine ECU for detecting the cetane number of the fuel according to the third embodiment of the invention.

FIG. 13 shows the process of the ECU 40 for detecting the cetane number of the fuel according to the present embodiment.

Steps S410 and S412 of this process are respectively identical to steps S450 and S452 of the process shown in FIG. 12 and described in the second embodiment. Therefore, a description of those steps is omitted hereinafter.

In step S414, the ECU 40 commands the fuel injector 30 to perform an injection for fuel property detection at a predetermined injection timing that is not advanced from TDC 200.

Upon being commanded by the ECU 40, the fuel injector 30 performs a single-shot injection at the predetermined injection timing.

In step S416, the ECU 40 estimates the torque T generated by the engine 2 through the injection for fuel property detection.

More specifically, the ECU 40 first detects, based on the sensing signal output from the rotational speed sensor 32, the increase ΔNE in the rotational speed of the engine 2 which is caused by the injection for fuel property detection. Then, the ECU 40 estimates the torque T based on the increase ΔNE.

In step S418, the ECU 40 determines whether a counter number NC, which indicates the number of injections for fuel property detection having been performed, is equal to 2.

If the determination in step S418 results in a "NO" answer, then the process returns to step S414 to iterate steps S414-S418.

It should be noted that, in the second iteration, the ECU 40 commands the fuel injector 30 to perform an injection for fuel property detection at a predetermined injection timing that is not advanced from TDC 200 and different from the predetermined injection timing in the first iteration.

On the other hand, if the determination in step S418 results in a "YES" answer, then the process proceeds to step S420.

In step S420, the ECU 40 computes a torque difference between the torques estimated in step S416.

In step S422, the ECU 40 determines the cetane number of the fuel based on a comparison between the torque difference computed in step S420 and a reference value. After that, the process goes to the end.

As above, in the present embodiment, the ECU 40 determines the cetane number of the fuel based on two detected values (i.e., the two increases ΔNE in the rotational speed of the engine 2). Consequently, the ECU 40 can more accurately determine the cetane number of the fuel than in the first embodiment.

In addition, the ECU 40 may also command the fuel injector 30 to perform more than two injections for fuel property detection at different predetermined injection timings and determine the cetane number of the fuel based on more than two torque differences.

Moreover, in the case of determining the cetane number of the fuel based on the increases ΔNE in the rotational speed of the engine 2, the ECU 40 may first compute the difference between the increases ΔNE, and then determine the cetane number of the fuel based on a comparison between the computed difference and a reference value.

Fourth Embodiment

This embodiment illustrates a process of the ECU 40 for detecting the cetane number of the fuel, which is a modification of the process according to the third embodiment.

Figure 6A:
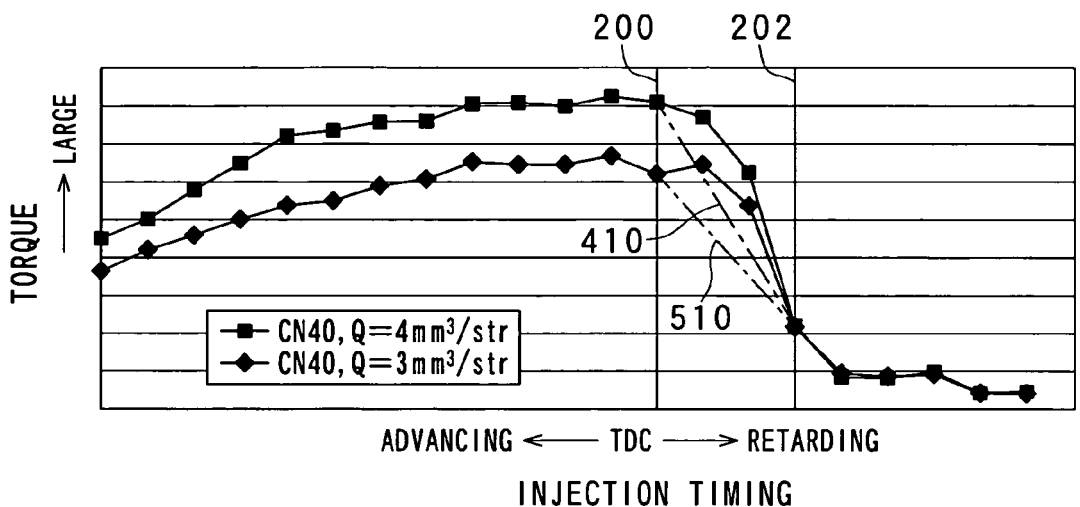
FIGS. 6A and 6B are graphical representations illustrating a method of detecting the cetane number of the fuel according to the fourth embodiment of the invention.

FIG. 6A shows torques generated through injections for fuel property detection which are performed, with the cetane number of the fuel equal to 40, to inject each of two different injection quantities of the fuel at different injection timings.

In FIG. 6A, a line 410 connects two points; one of them indicates the torque generated through the injection for fuel property detection which is performed at TDC 200 to inject a first injection quantity (i.e., 4 mm$^3$/stroke) of the fuel; the other indicates the torque generated through the injection for fuel property detection which is performed at the predetermined injection timing 202 to inject the first injection quantity of the fuel. On the other hand, a line 510 connects two other points; one of them indicates the torque generated through the injection for fuel property detection which is performed at TDC 200 to inject a second injection quantity (i.e., 3 mm$^3$/stroke) of the fuel; the other indicates the torque generated through the injection for fuel property detection which is performed at the predetermined injection timing 202 to inject the second injection quantity of the fuel.

It can be seen from FIG. 6A that the slope of the line 410 which corresponds to the first injection quantity is different from the slope of the line 510 which corresponds to the second injection quantity.

Figure 6B:
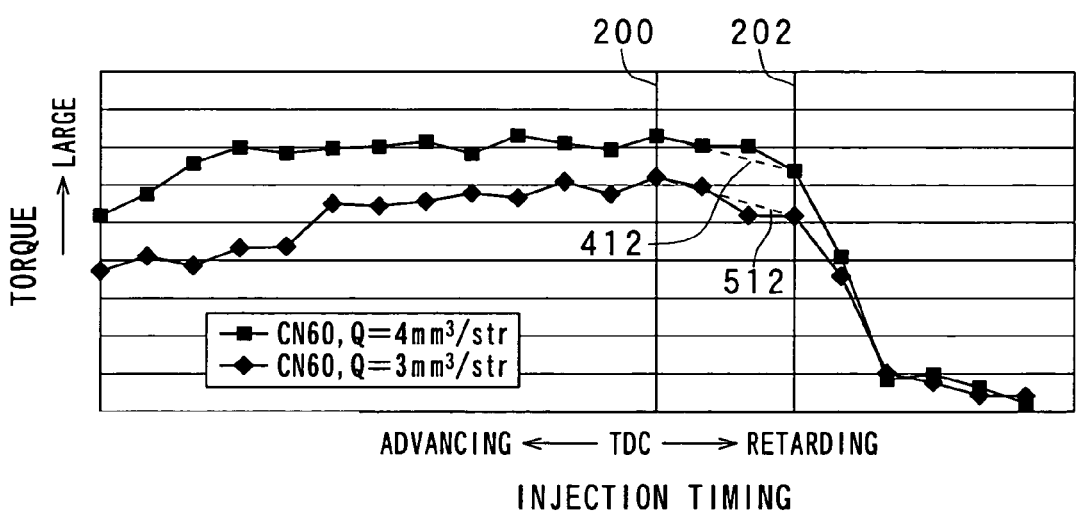

FIG. 6B shows torques generated through injections for fuel property detection which are performed, with the cetane number of the fuel equal to 60, to inject each of two different injection quantities of the fuel at different injection timings.

In FIG. 6B, a line 412 connects two points; one of them indicates the torque generated through the injection for fuel property detection which is performed at TDC 200 to inject the first injection quantity (i.e., 4 mm$^3$/stroke) of the fuel; the other indicates the torque generated through the injection for fuel property detection which is performed at the predetermined injection timing 202 to inject the first injection quantity of the fuel. On the other hand, a line 512 connects two other points; one of them indicates the torque generated through the injection for fuel property detection which is performed at TDC 200 to inject the second injection quantity (i.e., 3 mm$^3$/stroke) of the fuel; the other indicates the torque generated through the injection for fuel property detection which is performed at the predetermined injection timing 202 to inject the second injection quantity of the fuel.

It can be seen from FIG. 6B that the slope of the line 412 which corresponds to the first injection quantity is different from the slope of the line 512 which corresponds to the second injection quantity.

In view of the above, in order to more accurately detect the cetane number of the fuel, the ECU 40 first computes two differences. The first difference is between two torques that are generated through two injections for fuel property detection which are performed respectively at first and second injection timings to inject a first injection quantity of the fuel. The second difference is between two torques that are generated through two injections for fuel property detection which are performed respectively at the first and second injection timings to inject a second injection quantity of the fuel. The first and second injection timings are different from each other and both are not advanced from TDC 200. The first and second injection quantities are different from each other. Then, the ECU 40 determines the cetane number of the fuel based on the first and second differences.

Figure 14:
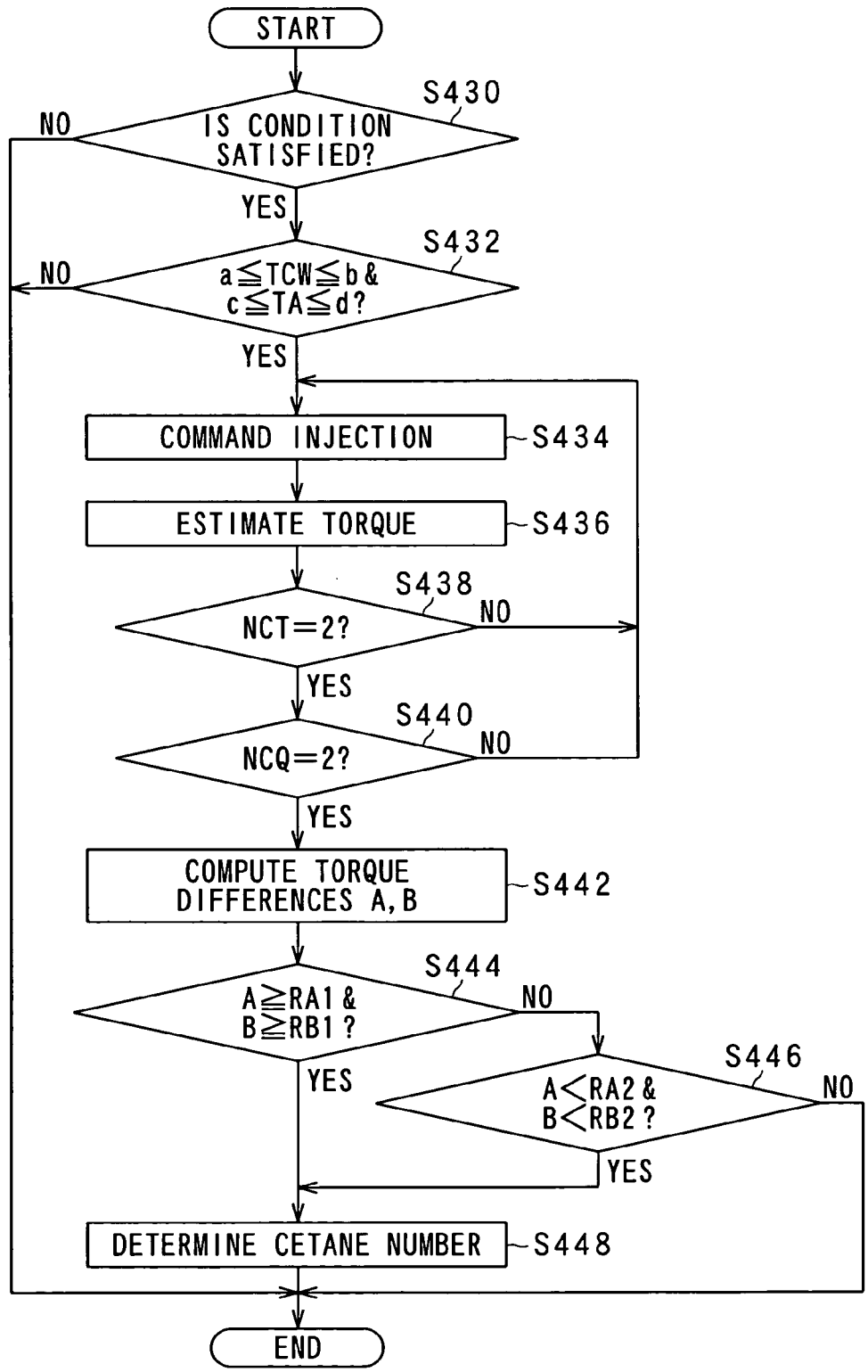
FIG. 14 is a flow chart illustrating a process of the engine ECU for detecting the cetane number of the fuel according to the fourth embodiment of the invention.

FIG. 14 shows the process of the ECU 40 for detecting the cetane number of the fuel according to the present embodiment.

Steps S430-S436 of this process are respectively identical to steps S410-S416 of the process shown in FIG. 13 and described in the third embodiment. Therefore, a description of those steps is omitted hereinafter.

In step S438, the ECU 40 determines whether a counter number NCT, which indicates the number of injections for fuel property detection having been performed with the same injection quantity, is equal to 2.

If the determination in step S438 results in a "NO" answer, then the process returns to step S434 to iterate steps S434-S438.

It should be noted that: in the first iteration of steps S434-S438, the ECU 40 commands the fuel injector 30 to perform an injection for fuel property detection at the first injection timing; and in the second iteration of S434-S438, the ECU 40 commands the fuel injector 30 to perform an injection for fuel property detection at the second injection timing.

On the other hand, if the determination in step S438 results in a "YES" answer, then the process proceeds to step S440.

In step S440, the ECU 40 further determines whether a counter number NCQ, which indicates the number of injection quantities having been applied in the injections for fuel property detection, is equal to 2.

If the determination in step S440 results in a "NO" answer, then the process returns to step S434 to iterate steps S434-S440.

It should be noted that: in the first iteration of steps S434-S440, the ECU 40 commands the fuel injector 30 to inject the first injection quantity of the fuel; and in the second iteration of steps S434-S440, the ECU 40 commands the fuel injector 30 to inject the second injection quantity of the fuel.

On the other hand, if the determination in step S440 results in a "YES" answer, then the process proceeds to step S442.

In step S442, the ECU 40 computes the first and second torque differences A and B.

More specifically, the ECU 40 computes the first torque difference A as the difference between the two torques that are generated through the two injections for fuel property detection which are performed respectively at the first and second injection timings to inject the first injection quantity of the fuel; it computes the second torque difference B as the difference between the two torques that are generated through the two injections for fuel property detection which are performed respectively at the first and second injection timings to inject the second injection quantity of the fuel.

In step S444, the ECU 40 determines whether the first torque difference is greater than or equal to a reference value RA1 and the second torque difference is greater than or equal to a reference value RB1.

If the determination in step S444 results in a "YES" answer, then the process goes on to step S448. On the other hand, if the determination in step S444 results in a "NO" answer, then the process proceeds to step S446.

In step S446, the ECU 40 further determines whether the first torque difference A is smaller than a reference value RA2 and the second torque difference B is smaller than a reference value RB2.

If the determination in step S446 results in a "NO" answer, then the process directly goes to the end. On the other hand, if the determination in step S446 results in a "YES" answer, then the process proceeds to step S448.

In step S448, the ECU 40 determines the cetane number of the fuel based on the results of the determination in step S444 or the determinations in steps S444 and S446. After that, the process goes to the end.

As above, in the present embodiment, the ECU 40 determines the cetane number of the fuel based on the two torque differences which respectively correspond to the two injection quantities. Consequently, the ECU 40 can more accurately determine the cetane number of the fuel than in the third embodiment.

In addition, the ECU 40 may also determine the cetane number of the fuel based on three or more torque differences which respectively correspond to three or more injection quantities.

Moreover, in the case of determining the cetane number of the fuel based on the increases ΔNE in the rotational speed of the engine 2, the ECU 40 may first compute two differences between the increases ΔNE which respectively correspond to the first and second injection quantities, and then determine the cetane number of the fuel based on the two differences.

Fifth Embodiment

This embodiment illustrates a process of the ECU 40 for detecting the cetane number of the fuel, which is different from the processes according to the previous embodiments.

Figure 7A:
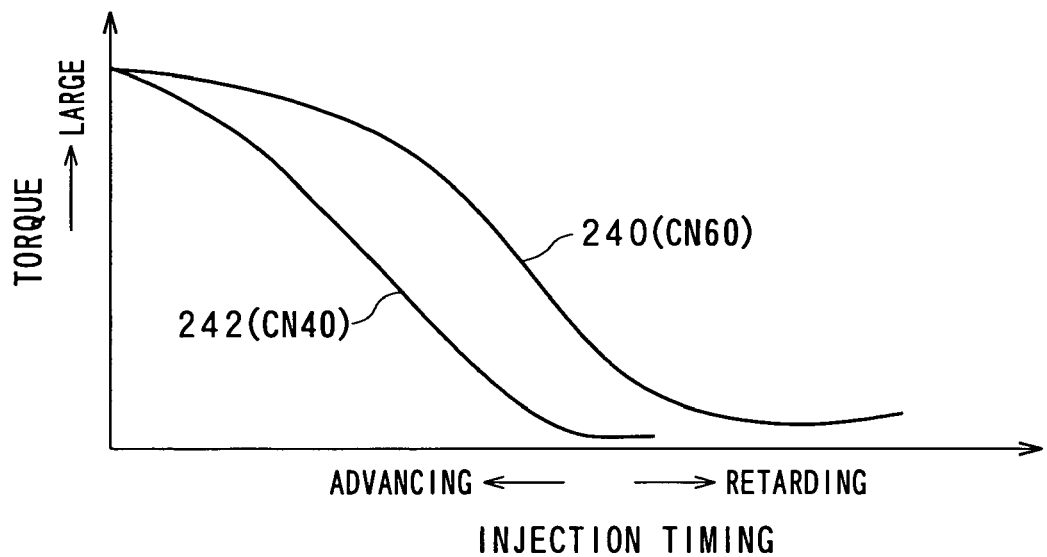
FIGS. 7A, 7B, and 8 are graphical representations illustrating a method of detecting the cetane number of the fuel according to the fifth embodiment of the invention.

FIG. 7A shows the change characteristics of the torques generated through injections for fuel property detection with respect to the injection timings for different cetane numbers of the fuel.

More specifically, in FIG. 7A, the line 240 indicates the change characteristics of the torques generated through injections for fuel property detection with respect to the injection timings for the cetane number of the fuel equal to 60 (i.e., CN60). On the other hand, the line 242 indicates the change characteristics of the torques generated through injections for fuel property detection with respect to the injection timings for the cetane number of the fuel equal to 40 (i.e., CN40).

It can be seen from FIG. 7A that the line 240 is different from the line 242. In other words, the change characteristics of the torques with respect to the injection timings depend on the cetane number of the fuel. Therefore, the cetane number of the fuel detected based on the change characteristics of the torques with respect to the injection timings.

Figure 7B:
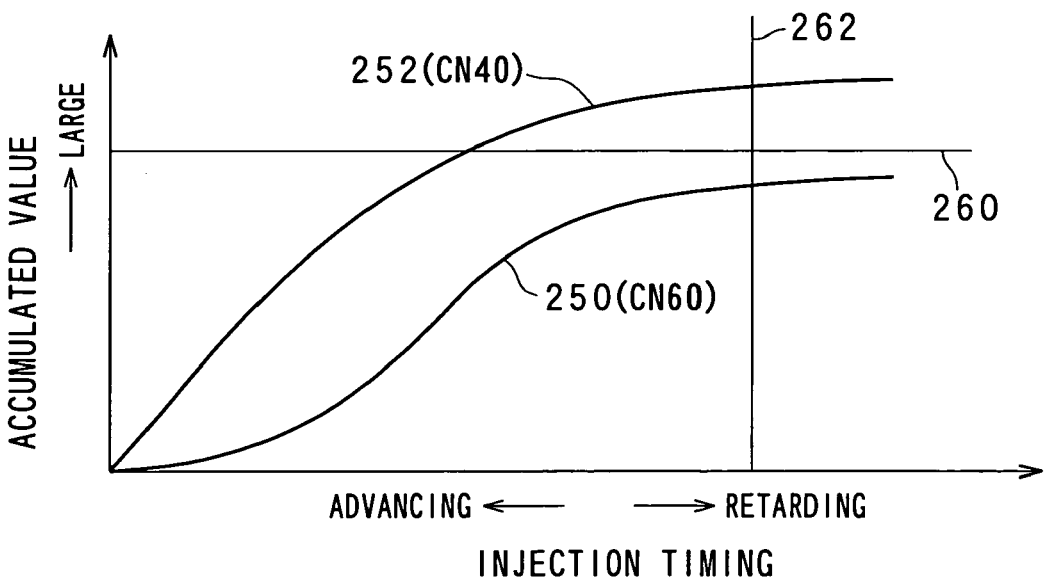

FIG. 7B shows accumulated values of the torques generated through injections for fuel property detection for different cetane numbers of the fuel.

More specifically, in FIG. 7B, the line 250 indicates accumulated values of the torques for the cetane number of the fuel equal to 60 (i.e., CN60). On the other hand, the line 252 indicates accumulated values of the torques for the cetane number of the fuel equal to 40 (i.e., CN40). In addition, in the present embodiment, a current accumulated value is computed by accumulating all the differences between the torques at the previous and current injection timings and the torque at an initial injection timing for the accumulation.

It can be seen from FIG. 7B that the line 250 is different from the line 252. In other words, the accumulated values of the torques depend on the cetane number of the fuel. Therefore, the cetane number of the fuel can be detected based on the accumulated values of the torques.

In view of the above, in the present embodiment, the ECU 40 first computes accumulated values of the torques generated through injections for fuel property detection, and then determines the cetane number of the fuel based on the computed accumulated values.

More specifically, the ECU 40 can determine the cetane number of the fuel based on a comparison between the accumulated value of the torques computed at a predetermined injection timing 260 and a reference accumulated value 260 as shown in FIG. 7B.

Figure 8:
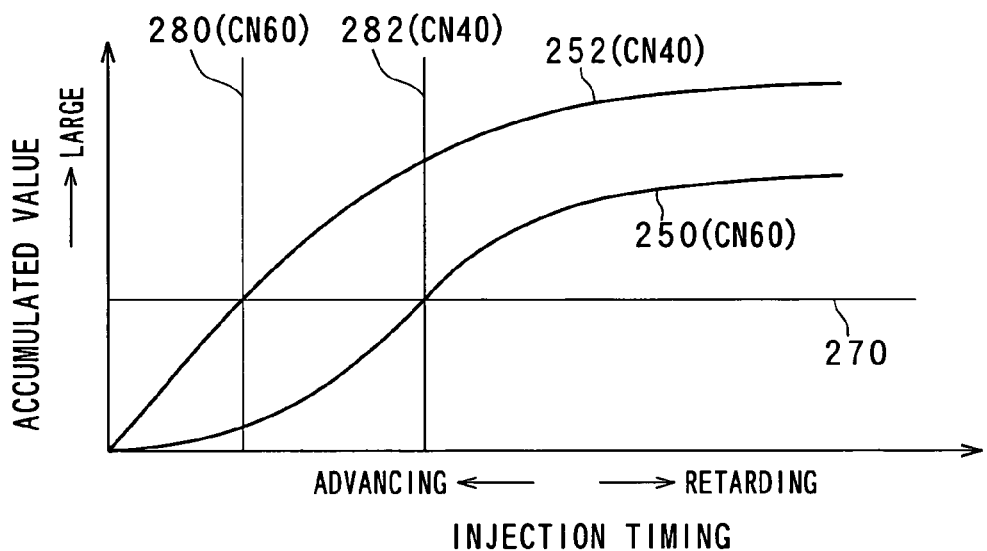

Moreover, referring to FIG. 8, in the case of the cetane number of the fuel being equal to 60, the accumulated value of the torques at the injection timing 280 is equal to a reference accumulated value 270. On the other hand, in the case of the cetane number of the fuel being equal to 40, the accumulated value of the torques at the injection timing 282 is equal to the reference accumulated value 270. The injection timing 280 is different from the injection timing 282.

Accordingly, the ECU 40 can also determine the cetane number of the fuel by: 1) estimating an injection timing at which the accumulated value of the torques is equal to the reference accumulated value 270; and 2) determining the cetane number of the fuel based on the estimated injection timing.

Figure 15:
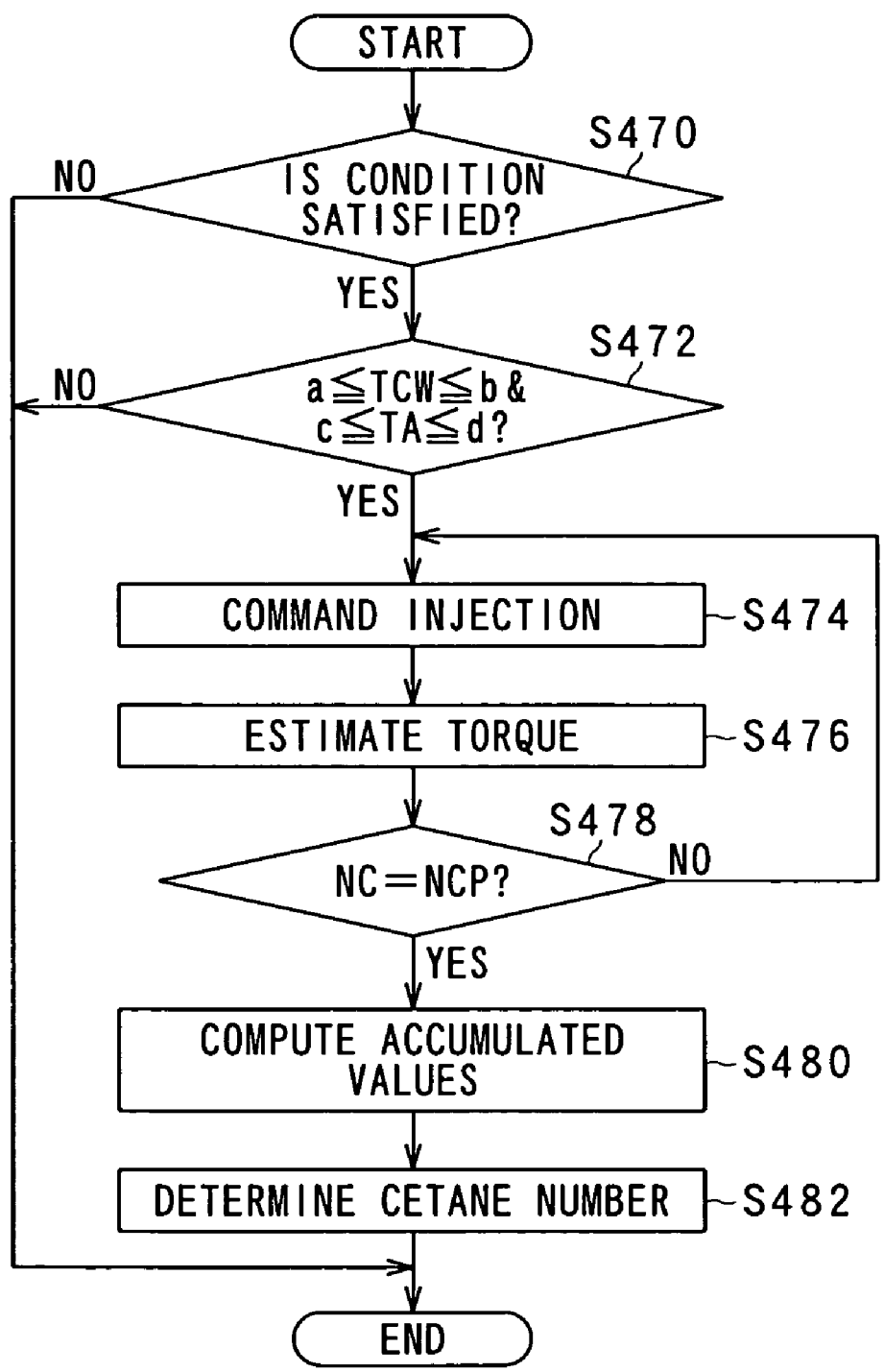
FIG. 15 is a flow chart illustrating a process of the engine ECU for detecting the cetane number of the fuel according to the fifth embodiment of the invention.

FIG. 15 shows the process of the ECU 40 for detecting the cetane number of the fuel according to the present embodiment.

Steps S470-S478 of this process are respectively identical to steps S450-S458 of the process shown in FIG. 12 and described in the second embodiment. Therefore, a description of those steps is omitted hereinafter.

In step S480, the ECU 40 computes, based on the torques T estimated in step S476, accumulated values of the torques T.

In step S482, the ECU 40 determines the cetane number of the fuel based on the accumulated values of the torques T computed in step S480. After that, the process goes to the end.

As above, in the present embodiment, the ECU 40 determines the cetane number of the fuel based on a plurality of detected values (i.e., the increases ΔNE in the rotational speed of the engine 2). Consequently, the ECU 40 can more accurately determine the cetane number of the fuel than in the first embodiment.

In addition, in the case of determining the cetane number of the fuel based on the increases ΔNE in the rotational speed of the engine 2, the ECU 40 may first compute accumulated values of the increases ΔNE, and then determine the cetane number of the fuel based on the computed accumulated values of the increases ΔNE.

Sixth Embodiment

This embodiment illustrates a process of the ECU 40 for detecting the cetane number of the fuel, which is a modification of the process according to the fifth embodiment.

As described in the fifth embodiment with reference to FIG. 7A, the change characteristics of the torques with respect to the injection timings depend on the cetane number of the fuel.

Figure 9:
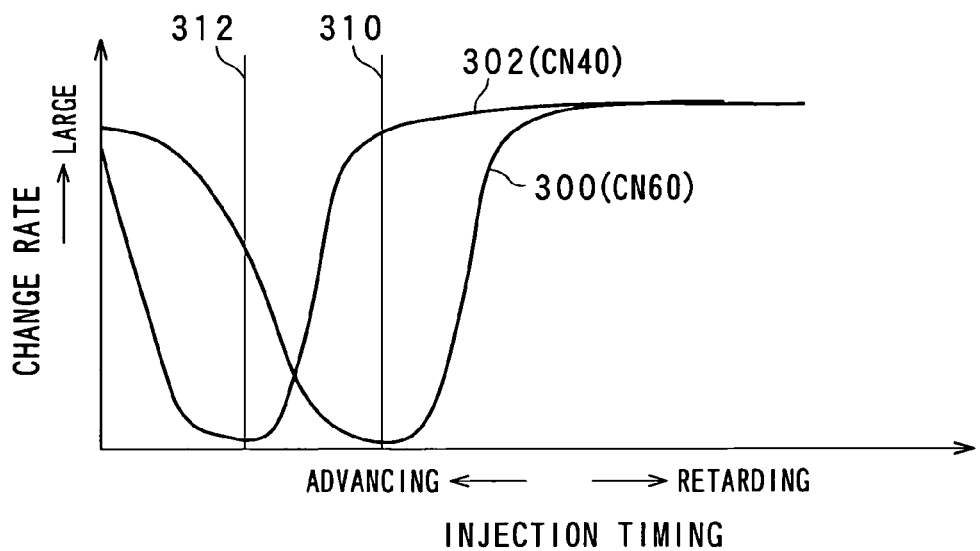
FIG. 9 is a graphical representation illustrating a method of detecting the cetane number of the fuel according to the sixth embodiment of the invention.

FIG. 9 shows change rates of the torques with respect to the injection timings for different cetane numbers of the fuel.

More specifically, in FIG. 9, the line 300 indicates change rates of the torques with respect to the injection timings for the cetane number of the fuel equal to 60 (i.e., CN60). On the other hand, the line 302 indicates change rates of the torques with respect to the injection timings for the cetane number of the fuel equal to 40 (i.e., CN40). In addition, in the present embodiment, a current change rate is computed by dividing the difference between the torques respectively at the current and previous injection timings by the difference between the current and previous injection timings.

It can be seen from FIG. 9 that the line 300 is different from the line 302. In other words, the change rates of the torques with respect to the injection timings depend on the cetane number of the fuel. Therefore, the cetane number of the fuel can be detected based on the change rates of the torques with respect to the injection timings.

In view of the above, in the present embodiment, the ECU 40 first computes the change rates of the torques generated through injections for fuel property detection with respect to the injection timings, and then determines the cetane number of the fuel based on the computed change rates.

More specifically, referring to FIG. 9, in the case of the cetane number of the fuel being equal to 60, the change rates of the torques with respect to the injection timings are minimal at the injection timing 310. On the other hand, in the case of the cetane number of the fuel being equal to 40, the change rates of the torques with respect to the injection timings are minimal at the injection timing 312. The injection timing 310 is different from the injection timing 312.

Therefore, the ECU 40 can determine the cetane number of the fuel by: 1) estimating an injection timing at which the change rate of the torques is minimal; and d) determining the cetane number of the fuel based on the estimated injection timing.

Figure 16:
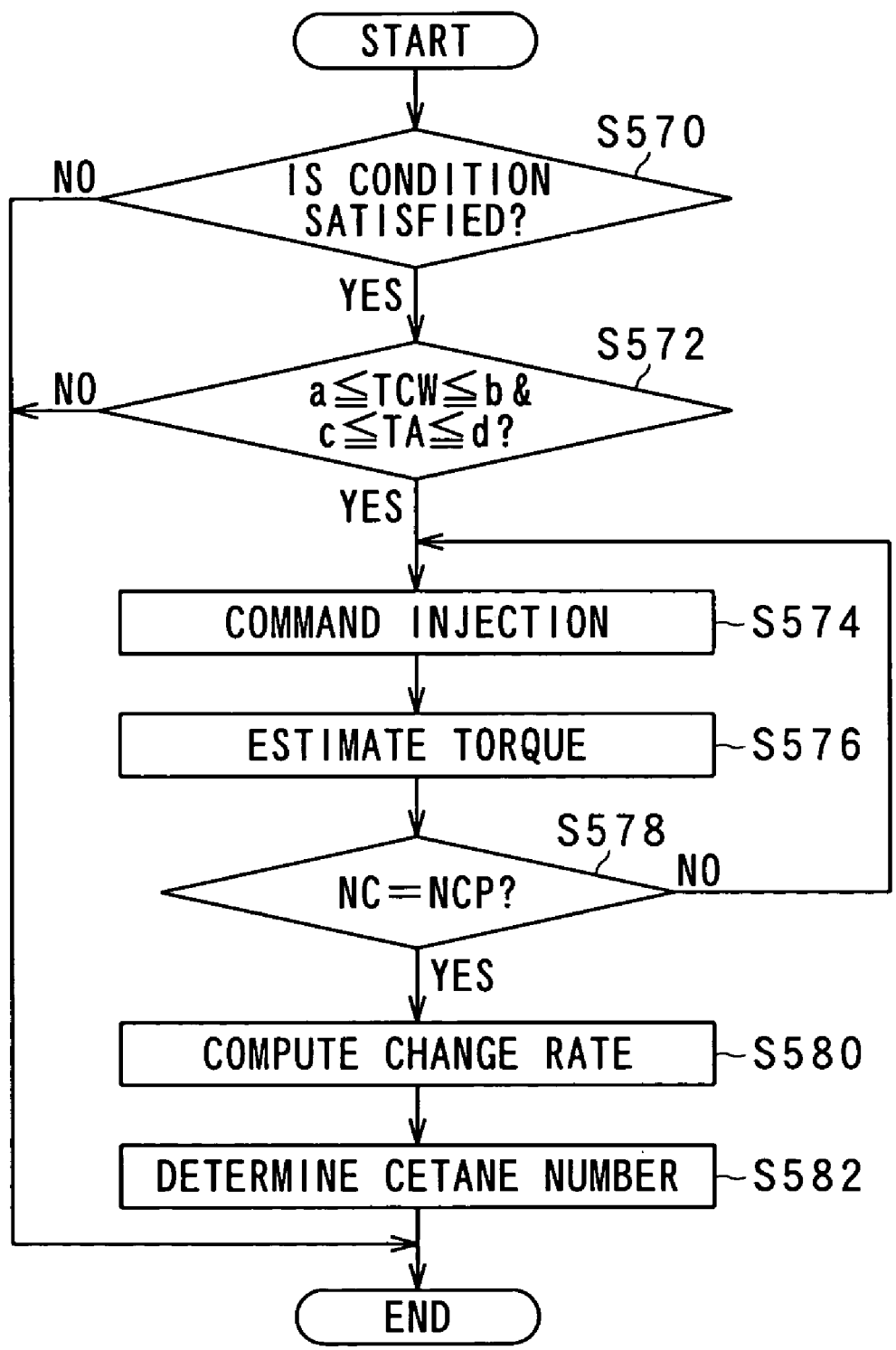
FIG. 16 is a flow chart illustrating a process of the engine ECU for detecting the cetane number of the fuel according to the sixth embodiment of the invention.

FIG. 16 shows the process of the ECU 40 for detecting the cetane number of the fuel according to the present embodiment.

Steps S570-S578 of this process are respectively identical to steps S470-S478 of the process shown in FIG. 1S and described in the fifth embodiment. Therefore, a description of those steps is omitted hereinafter.

In step S580, the ECU 40 computes, based on the torques T estimated in step S576, change rates of the torques T with respect to the injection timings.

In step S582, the ECU 40 determines the cetane number of the fuel based on the change rates of the torques T computed in step S580. After that, the process goes to the end.

As above, in the present embodiment, the ECU 40 determines the cetane number of the fuel based on a plurality of detected values (i.e., the increases ΔNE in the rotational speed of the engine 2). Consequently, the ECU 40 can more accurately determine the cetane number of the fuel than in the first embodiment.

In addition, in the case of determining the cetane number of the fuel based on the increases ΔNE in the rotational speed of the engine 2, the ECU 40 may first compute change rates of the increases ΔNE with, respect to the injection timings, and then determine the cetane number of the fuel based on the computed change rates of the increases ΔNE.

While the above particular embodiments of the present invention have been shown and described, it will be understood by those skilled in the art that various modifications, changes, and improvements may be made without departing from the spirit of the invention.

1) In the first to sixth embodiments, the ECU 40 determines the cetane number of the fuel based on the torques (or torque) generated by the engine 2 through the injections (or injection) for fuel property detection.

Figure 10:
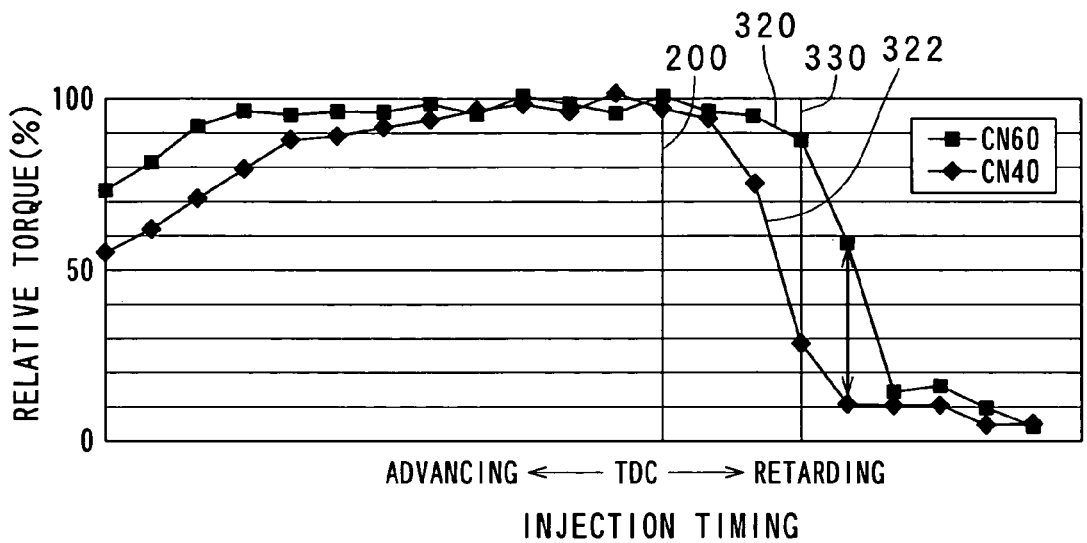
FIG. 10 is a graphical representation illustrating relative values of the torques generated by the engine with different cetane numbers of the fuel.

However, as shown in FIG. 10, the relative torques, which are computed by dividing each of the torques by the maximum one of the torques, also depends on the cetane number of the fuel. More specifically, in FIG. 10, the line 320 indicates the relative torques for the cetane number of the fuel equal 60; the line 322 indicates the relative torques for the cetane number of the fuel equal to 40. The line 320 is different from the line 322.

Therefore, in the first to sixth embodiments, the ECU 40 may be modified to first compute the relative torques (or torque) by dividing the torques (or torque) by a reference torque and then determines the cetane number of the fuel based on the computed relative torques (or torque).

With the above modification, the influence of errors in detecting the torques can be minimized.

In addition, in the case of determining the cetane number of the fuel based on the increases (increase) ΔNE in the rotational speed of the engine 2, the ECU 40 may first compute relative increases (or a relative increase) in the rotational speed by diving each of the increases (or increase) ΔNE by a reference increase, and then determine the cetane number of the fuel based on the computed relative increases (or increase).

2) In the first to sixth embodiments, the ECU 40 determines the cetane number of the fuel with a fixed value of the rail pressure.

However, torques generated through injections for fuel property detection change with the rail pressure. Moreover, the manner in which the torques change with the cetane number of the fuel also changes with the rail pressure (i.e., the pressure of the fuel supplied to the fuel injectors 30).

Therefore, the ECU 40 may be modified to: 1) regulate the rail pressure to a plurality of values by controlling either or both of the fuel-feed adjusting valve 18 and the pressure reducing valve 24; and 2) detect the increases (or increase) ΔNE and estimate the torque T at each of the values of the rail pressure; 3) determine the cetane number of the fuel based either on all the estimated torques T or on the all the increases ΔNE.

With the above modification, it is possible to improve the accuracy in detecting the cetane number of the fuel.

3) In the previous embodiments, the ECU 40 detects the cetane number of the fuel as a property of the fuel.

However, the ECU 40 may also detect any other property of the fuel which influences the state of combustion in the cylinders of the engine 2 and thereby causes the rotational speed of the engine 2 to change.

4) In the previous embodiments, each injection for fuel property detection is a single-shot injection. However, each injection for fuel property detection may be a multistage injection provided that it is possible to accurately detect the change in the rotational speed of the engine caused by the multistage injection.

5) In the previous embodiments, the engine 2 is a diesel engine. However, the present invention may also be applied to an internal combustion engine of any other type in which the properties of the fuel injected into the engine influences the combustion in the engine and thereby cause the rotational speed of the engine to change.

6) In the previous embodiments, the ECU 40 serves as the fuel property detector for detecting the cetane number of the fuel. The ECU 40 is configured to perform the functions for detecting the cetane number of the fuel by means of software, more specifically by executing the program installed in the ROM or flash memory thereof. However, the ECU 40 may also be configured to perform the functions by means of hardware, for example by employing a dedicated circuit for performing one or more of the functions.

What is claimed is:

1. A fuel property detector for detecting a property of fuel injected by a fuel injector into a cylinder of an internal combustion engine, the fuel property detector comprising:
   an injection commander that commands the fuel elector to perform a fuel injection for fuel property detection into the cylinder of the engine;
   a change detector that detects a change in a rotational speed of the engine which is caused by the fuel injection for fuel property detection;
   a fuel property determiner that determines the property of the fuel based on the change in the rotational speed of the engine detected by the change detector;
   a torque estimator that estimates, based on the change in the rotational speed of the engine detected by the change detector, torque which is generated by the engine through the fuel injection for fuel property detection;
   an injection timing estimator;
      wherein the fuel property determiner determines the property of the fuel based on the torque estimated by the torque estimator;
      wherein the injection commander commands the fuel injector to perform a plurality of fuel injections for fuel property detection at different injection timings,
      the change detector detects, for each of the fuel injections for fuel property detection, the change in the rotational speed of the engine which is caused by the fuel injection for fuel property detection,
      the torque estimator estimates, for each of the fuel injections for fuel property detection, the torque generated by the engine through the fuel injection for fuel property detection based on the change detected by the change detector,
      the timing estimator estimates, based on all the torques estimated by the torque estimator, an injection timing necessary for causing the engine to generate a reference torque, and
      the fuel property determiner determines the property of the fuel based on the injection timing estimated by the timing estimator.

2. The fuel property detector as set forth in claim 1, further comprising a condition determiner that determines whether a condition for detecting the property of the fuel is satisfied,
   wherein the injection commander commands the fuel injector to perform the fuel injection for fuel property detection only when it is determined by the condition determiner that the condition for detecting the property of the fuel is satisfied.

3. The fuel property detector as set forth in claim 2, wherein the condition for detecting the property of the fuel is set to a condition where the engine is decelerating without the fuel being injected into the engine.

4. The fuel property detector as set forth in claim 1, wherein the engine is a compression ignition engine, and the injection commander commands the fuel injector to perform the fuel injection for fuel property detection at an injection timing retarded from top-dead-center.

5. The fuel property detector as set forth in claim 1, wherein the property of the fuel is the cetane number of the fuel.

6. A fuel property detector for detecting a property of fuel injected by a fuel injector into a cylinder of an internal combustion engine, the fuel property detector comprising:
   an injection commander that commands the fuel injector to perform a fuel injection for fuel property detection into the cylinder of the engine;
   a change detector that detects a change in a rotational speed of the engine which is caused by the fuel injection for fuel property detection;
   a fuel property determiner that determines the property of the fuel based on the change in the rotational speed of the engine detected by the change detector;
   a torque estimator that estimates, based on the change in the rotational speed of the engine detected by the change detector. torque which is generated by the engine through the fuel injection for fuel property detection;
   a difference computer;
   wherein the fuel property determiner determines the property of the fuel based on the torque estimated by the torque estimator;
   wherein the injection commander commands the fuel injector to perform two fuel injections for fuel property detection respectively at two predetermined injection timings,
   the change detector detects, for each of the two fuel injections for fuel property detection, the change in the rotational speed of the engine which is caused by the fuel injection for fuel property detection,
   the torque estimator estimates, for each of the two fuel injections for fuel property detection, the torque generated by the engine through the fuel injection for fuel property detection based on the change detected by the change detector, the difference computer computes a difference between the torques estimated by the torque estimator, and the fuel property determiner determines the property of the fuel based on the difference computed by the difference computer.

7. The fuel property detector as set forth in claim 6, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

8. The fuel property detector as set forth in claim 7, wherein the condition for detecting the property of the fuel is set to a condition where the engine is decelerating without the fuel being injected into the engine.

9. The fuel property detector as set forth in claim 6, wherein the engine is a compression ignition engine, and the injection commander commands the fuel injector to perform the fuel injection for fuel property detection at an injection timing retarded from top-dead-center.

10. The fuel property detector as set forth in claim 6, wherein the property of the fuel is the cetane number of the fuel.

11. A fuel property detector for detecting a property of fuel injected by a fuel injector into a cylinder of an internal combustion engine, the fuel property detector comprising:

an injection commander that commands the fuel injector to perform a fuel injection for fuel property detection into the cylinder of the engine;

a change detector that detects a change in a rotational speed of the engine which is caused by the fuel injection for fuel property detection;

a fuel property determiner that determines the property of the fuel based on the change in the rotational speed of the engine detected by the change detector;

a torque estimator that estimates, based on the change in the rotational speed of the engine detected by the change detector, torque which is generated by the engine through the fuel injection for fuel property detection;

a difference computer;

wherein the fuel property determiner determines the property of the fuel based on the torque estimated by the torque estimator;

wherein the injection commander commands the fuel injector to perform first to fourth fuel injections for fuel property detection, the first fuel injection for fuel property detection being performed at a first injection timing to inject a first injection quantity of the fuel, the second fuel injection for fuel property detection being performed at a second injection timing to inject the first injection quantity of the fuel, the third fuel injection for fuel property detection being performed at the first injection timing to inject a second injection quantity of the fuel, the fourth fuel injection for fuel property detection being performed at the second injection timing to inject the second injection quantity of the fuel, the change detector detects, for each of the first to fourth fuel injections for fuel property detection, the change in the rotational speed of the engine which is caused by the fuel injection for fuel property detection, the torque estimator estimates, for each of the first to fourth fuel injections for fuel property detection, the torque generated by the engine through the fuel injection for fuel property detection based on the change detected by the change detector, the difference computer computes a first difference between the two torques which are generated respectively through the first and second fuel injections for fuel property detection and estimated by the torque estimator as well as a second difference between the two torques which are generated respectively through the third and fourth fuel injections for fuel property detection and estimated by the torque estimator, and the fuel property determiner determines the property of the fuel based on both the first and second differences computed by the difference computer.

12. The fuel property detector as set forth in claim 11, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

13. The fuel property detector as set forth in claim 12, wherein the condition for detecting the property of the fuel is set to a condition where the engine is decelerating without the fuel being injected into the engine.

14. The fuel property detector as set forth in claim 11, wherein the engine is a compression ignition engine, and the injection commander commands the fuel injector to perform the fuel injection for fuel property detection at an injection timing retarded from top-dead-center.

15. The fuel property detector as set forth in claim 11, wherein the property of the fuel is the cetane number of the fuel.

16. A fuel property detector for detecting a property of fuel injected by a fuel injector into a cylinder of an internal combustion engine, the fuel property detector comprising:

an injection commander that commands the fuel injector to perform a fuel injection for fuel property detection into the cylinder of the engine;

a change detector that detects a change in a rotational speed of the engine which is caused by the fuel injection for fuel property detection;

a fuel property determiner that determines the property of the fuel based on the change in the rotational speed of the engine detected by the change detector;

a torque estimator that estimates, based on the change in the rotational speed of the engine detected by the change detector, torque which is generated by the engine through the fuel injection for fuel property detection;

an accumulated value computer;

wherein the fuel property determiner determines the property of the fuel based on the torque estimated by the torque estimator;

wherein the injection commander commands the fuel injector to perform a plurality of fuel injections for fuel property detection at different injection timings, the change detector detects, for each of the fuel injections for fuel property detection, the change in the rotational speed of the engine which is caused by the fuel injection for fuel property detection, the torque estimator estimates, for each of the fuel injections for fuel property detection, the torque generated by the engine through the fuel injection for fuel property detection based on the change detected by the change detector, the accumulated value computer computes, based on the torques estimated by the torque estimator, an accumulated value of the torques at each of the injection timings, and the fuel property determiner determines the property of the fuel based on the accumulated values computed by the accumulated value computer.

17. The fuel property detector as set forth in claim 16, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

18. The fuel property detector as set forth in claim 17, wherein the condition for detecting the property of the fuel is set to a condition where the engine is decelerating without the fuel being injected into the engine.

19. The fuel property detector as set forth in claim 16, wherein the engine is a compression ignition engine, and the injection commander commands the fuel injector to perform the fuel injection for fuel property detection at an injection timing retarded from top-dead-center.

20. The fuel property detector as set forth in claim 16, wherein the property of the fuel is the cetane number of the fuel.

21. A fuel property detector for detecting a property of fuel injected by a fuel injector into a cylinder of an internal combustion engine, the fuel property detector comprising:

an injection commander that commands the fuel injector to perform a fuel injection for fuel property detection into the cylinder of the engine;

a change detector that detects a change in a rotational speed of the engine which is caused by the fuel injection for fuel property detection;

a fuel property determiner that determines the property of the fuel based on the change in the rotational speed of the engine detected by the change detector; and an injection timing estimator;

wherein the injection commander commands the fuel injector to perform a plurality of fuel injections for fuel property detection at different injection timings, the change detector detects, for each of the fuel injections for fuel property detection, the change in the rotational speed of the engine which is caused by the fuel injection for fuel property detection, the timing estimator estimates, based on all the changes in the rotational speed of the engine detected by the change detector, an injection timing necessary for causing a predetermined change in the rotational speed of the engine, and the fuel property determiner determines the property of the fuel based on the injection timing estimated by the timing estimator.

22. The fuel property detector as set forth in claim 21, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

23. The fuel property detector as set forth in claim 22, wherein the condition for detecting the property of the fuel is set to a condition where the engine is decelerating without the fuel being injected into the engine.

24. The fuel property detector as set forth in claim 21, wherein the engine is a compression ignition engine, and the injection commander commands the fuel injector to perform the fuel injection for fuel property detection at an injection timing retarded from top-dead-center.

25. The fuel property detector as set forth in claim 21, wherein the property of the fuel is the cetane number of the fuel.

26. A fuel property detector for detecting a property of fuel injected by a fuel injector into a cylinder of an internal combustion engine, the fuel property detector comprising:

an injection commander that commands the fuel injector to perform a fuel injection for fuel property detection into the cylinder of the engine;

a change detector that detects a change in a rotational speed of the engine which is caused by the fuel injection for fuel property detection;

a fuel property determiner that determines the property of the fuel based on the change in the rotational speed of the engine detected by the change detector; and a difference computer;

wherein the injection commander commands the fuel injector to perform two fuel injections for fuel property detection respectively at two predetermined injection timings, the change detector detects, for each of the two fuel injections for fuel property detection, the change in the rotational speed of the engine which is caused by the fuel injection for fuel property detection, the difference computer computes a difference between the amounts of the changes detected by the change detector, and the fuel property determiner determines the property of the fuel based on the difference computed by the difference computer.

27. The fuel property detector as set forth in claim 26, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

28. The fuel property detector as set forth in claim 27, wherein the condition for detecting the property of the fuel is set to a condition where the engine is decelerating without the fuel being injected into the engine.

29. The fuel property detector as set forth in claim 26, wherein the engine is a compression ignition engine, and the injection commander commands the fuel injector to perform the fuel injection for fuel property detection at an injection timing retarded from top-dead-center.

30. The fuel property detector as set forth in claim 26, wherein the property of the fuel is the cetane number of the fuel.

31. A fuel property detector for detecting a property of fuel injected by a fuel injector into a cylinder of an internal combustion engine, the fuel property detector comprising:

an injection commander that commands the fuel injector to perform a fuel injection for fuel property detection into the cylinder of the engine;

a change detector that detects a change in a rotational speed of the engine which is caused by the fuel injection for fuel property detection;

a fuel property determiner that determines the property of the fuel based on the change in the rotational speed of the engine detected by the change detector; and a difference computer;

wherein the injection commander commands the fuel injector to perform first to fourth fuel injections for fuel property detection, the first fuel injection for fuel property detection being performed at a first injection timing to inject a first injection quantity of the fuel, the second fuel injection for fuel property detection being performed at a second injection timing to inject the first injection quantity of the fuel, the third fuel injection for fuel property detection being performed at the first injection timing to inject a second injection quantity of the fuel, the fourth fuel injection for fuel property detection being performed at the second injection timing to inject the second injection quantity of the fuel, the change detector detects, for each of the first to fourth fuel injections for fuel property detection, the change in the rotational speed of the engine which is caused by the fuel injection for fuel property detection, the difference computer computes a first difference between the amounts of the two changes which are caused respectively by the first and second fuel injections for fuel property detection and detected by the change detector as well as a second difference between the amounts of the two changes which are caused respectively by the third and fourth fuel injections for fuel property detection and detected by the change detector, and the fuel property determiner determines the property of the fuel based on both the first and second differences computed by the difference computer.

32. The fuel property detector as set forth in claim 31, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

33. The fuel property detector as set forth in claim 32, wherein the condition for detecting the property of the fuel is set to a condition where the engine is decelerating without the fuel being injected into the engine.

34. The fuel property detector as set forth in claim 31, wherein the engine is a compression ignition engine, and the injection commander commands the fuel injector to perform the fuel injection for fuel property detection at an injection timing retarded from top-dead-center.

35. The fuel property detector as set forth in claim 31, wherein the property of the fuel is the cetane number of the fuel.

36. A fuel property detector for detecting a property of fuel injected by a fuel injector into a cylinder of an internal combustion engine, the fuel property detector comprising:

an injection commander that commands the fuel injector to perform a fuel injection for fuel property detection into the cylinder of the engine;

a change detector that detects a change in a rotational speed of the engine which is caused by the fuel injection for fuel property detection;

a fuel property determiner that determines the property of the fuel based on the change in the rotational speed of the engine detected by the change detector;

an accumulated value computer;

wherein the injection commander commands the fuel injector to perform a plurality of fuel injections for fuel property detection at different injection timings, the change detector detects, for each of the fuel injections for fuel property detection, the change in the rotational speed of the engine which is caused by the fuel injection for fuel property detection, the accumulated value computer computes, based on the amounts of the changes detected by the change detector, an accumulated value of the amounts of the changes at each of the injection timings, and the fuel property determiner determines the property of the fuel based on the accumulated values computed by the accumulated value computer.

37. The fuel property detector as set forth in claim 36, further comprising a condition determiner that determines whether a condition for detecting the property of the fuel is satisfied, wherein the injection commander commands the fuel injector to perform the fuel injection for fuel property detection only when it is determined by the condition determiner that the condition for detecting the property of the fuel is satisfied.

38. The fuel property detector as set forth in claim 37, wherein the condition for detecting the property of the fuel is set to a condition where the engine is decelerating without the fuel being injected into the engine.

39. The fuel property detector as set forth in claim 36, wherein the engine is a compression ignition engine, and the injection commander commands the fuel injector to perform the fuel injection for fuel property detection at an injection timing retarded from top-dead-center.

40. The fuel property detector as set forth in claim 36, wherein the property of the fuel is the cetane number of the fuel.

* * * * *